(12) United States Patent
Holman et al.

(10) Patent No.: US 12,176,529 B2
(45) Date of Patent: *Dec. 24, 2024

(54) MICROCOMPOSITE ALLOY STRUCTURE

(71) Applicant: 6K Inc., North Andover, MA (US)

(72) Inventors: Richard K. Holman, Wellesley, MA (US); Leah Nation, Cambridge, MA (US)

(73) Assignee: 6K Inc., North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/509,166

(22) Filed: Nov. 14, 2023

(65) Prior Publication Data

US 2024/0088369 A1 Mar. 14, 2024

Related U.S. Application Data

(63) Continuation of application No. 17/304,727, filed on Jun. 24, 2021, now Pat. No. 11,855,278.

(60) Provisional application No. 63/043,958, filed on Jun. 25, 2020.

(51) Int. Cl.
*H01M 4/38* (2006.01)
*H01M 10/0525* (2010.01)
*H01M 4/02* (2006.01)

(52) U.S. Cl.
CPC ....... *H01M 4/386* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | |
|---|---|---|
| 1,699,205 A | 1/1929 | Emil et al. |
| 2,892,215 A | 6/1959 | Gerhard et al. |
| 3,290,723 A | 12/1966 | John et al. |
| 3,293,334 A | 12/1966 | Bylund et al. |
| 3,434,831 A | 3/1969 | Knopp |
| 3,466,165 A | 9/1969 | Rhys et al. |
| RE26,879 E | 5/1970 | Kelso |

(Continued)

FOREIGN PATENT DOCUMENTS

| | | |
|---|---|---|
| AU | 2003211869 A1 | 9/2003 |
| AU | 2014394102 B2 | 6/2020 |

(Continued)

OTHER PUBLICATIONS

"Effect of PS-PVD production throughput on silicon nanoparticls for negative electrode of lithium ion batteries" by Ohta et al. inJ. Phys. D Appl. Phys. 51 (2018) 105501. (Year: 2018).*

(Continued)

*Primary Examiner* — Wyatt P McConnell
(74) *Attorney, Agent, or Firm* — Knobbe, Martens, Olson & Bear, LLP

(57) ABSTRACT

Disclosed herein are embodiments of strain tolerant particles, methods of manufacturing such structures, and feedstock to form said structures. In some embodiments, the structures can include alternating regions of an energy storage structure and a reinforcing structure. Advantageously, when the strain tolerant particles are used within an anode of a lithium ion battery, the reinforcing structure may provide mechanical stability to the particles and thus increase cycle life.

20 Claims, 11 Drawing Sheets

(56) References Cited

U.S. PATENT DOCUMENTS

| | | | |
|---|---|---|---|
| 3,652,259 A | 3/1972 | Knopp | |
| 3,802,816 A | 4/1974 | Kaufmann | |
| 3,845,344 A | 10/1974 | Rainer | |
| 3,909,241 A | 9/1975 | Cheney et al. | |
| 3,966,374 A | 6/1976 | Honnorat et al. | |
| 3,974,245 A | 8/1976 | Cheney et al. | |
| 4,076,640 A | 2/1978 | Forgensi et al. | |
| 4,177,026 A | 12/1979 | Honnorat et al. | |
| 4,212,837 A | 7/1980 | Kubo et al. | |
| 4,221,554 A | 9/1980 | Oguchi et al. | |
| 4,221,775 A | 9/1980 | Anno | |
| 4,265,730 A | 5/1981 | Hirose et al. | |
| 4,423,303 A | 12/1983 | Hirose et al. | |
| 4,431,449 A | 2/1984 | Dillon et al. | |
| 4,439,410 A | 3/1984 | Santen et al. | |
| 4,544,404 A | 10/1985 | Yolton et al. | |
| 4,569,823 A | 2/1986 | Westin | |
| 4,599,880 A | 7/1986 | Stepanenko et al. | |
| 4,611,108 A | 9/1986 | Leprince et al. | |
| 4,670,047 A | 6/1987 | Kopatz et al. | |
| 4,692,584 A | 9/1987 | Caneer, Jr. | |
| 4,705,560 A | 11/1987 | Kemp et al. | |
| 4,711,660 A | 12/1987 | Kemp et al. | |
| 4,711,661 A | 12/1987 | Kemp et al. | |
| 4,714,587 A | 12/1987 | Eylon et al. | |
| 4,731,110 A | 3/1988 | Kopatz et al. | |
| 4,731,111 A | 3/1988 | Kopatz et al. | |
| 4,772,315 A | 9/1988 | Johnson et al. | |
| 4,778,515 A | 10/1988 | Kemp et al. | |
| 4,780,131 A | 10/1988 | Kemp et al. | |
| 4,780,881 A | 10/1988 | Zhang et al. | |
| 4,783,216 A | 11/1988 | Kemp et al. | |
| 4,783,218 A | 11/1988 | Kemp et al. | |
| 4,787,934 A | 11/1988 | Johnson et al. | |
| 4,802,915 A | 2/1989 | Kopatz et al. | |
| 4,836,850 A | 6/1989 | Kemp et al. | |
| 4,859,237 A | 8/1989 | Johnson et al. | |
| 4,923,509 A | 5/1990 | Kemp et al. | |
| 4,923,531 A | 5/1990 | Fisher | |
| 4,943,322 A | 7/1990 | Kemp et al. | |
| 4,944,797 A | 7/1990 | Kemp et al. | |
| 4,952,389 A | 8/1990 | Szymanski et al. | |
| 5,022,935 A | 6/1991 | Fisher | |
| 5,032,202 A | 7/1991 | Tsai et al. | |
| 5,041,713 A | 8/1991 | Weidman | |
| 5,095,048 A | 3/1992 | Takahashi et al. | |
| 5,114,471 A | 5/1992 | Johnson et al. | |
| 5,131,992 A | 7/1992 | Church et al. | |
| 5,200,595 A | 4/1993 | Boulos et al. | |
| 5,234,526 A | 8/1993 | Chen et al. | |
| 5,290,507 A | 3/1994 | Runkle | |
| 5,292,370 A | 3/1994 | Tsai et al. | |
| 5,370,765 A | 12/1994 | Dandl | |
| 5,376,475 A | 12/1994 | Ovshinsky et al. | |
| 5,395,453 A | 3/1995 | Noda | |
| 5,411,592 A | 5/1995 | Ovshinsky et al. | |
| 5,431,967 A | 7/1995 | Manthiram et al. | |
| 5,518,831 A | 5/1996 | Tou et al. | |
| 5,567,243 A | 10/1996 | Foster et al. | |
| 5,665,640 A | 9/1997 | Foster et al. | |
| 5,671,045 A | 9/1997 | Woskov et al. | |
| 5,676,919 A | 10/1997 | Kawamura et al. | |
| 5,750,013 A | 5/1998 | Lin | |
| 5,776,323 A | 7/1998 | Kobashi | |
| 5,866,213 A | 2/1999 | Foster et al. | |
| 5,876,684 A | 3/1999 | Withers et al. | |
| 5,909,277 A | 6/1999 | Woskov et al. | |
| 5,958,361 A | 9/1999 | Laine et al. | |
| 5,969,352 A | 10/1999 | French et al. | |
| 5,980,977 A | 11/1999 | Deng et al. | |
| 5,989,648 A | 11/1999 | Phillips | |
| 6,027,585 A | 2/2000 | Patterson et al. | |
| 6,200,651 B1 | 3/2001 | Roche et al. | |
| 6,221,125 B1 | 4/2001 | Soda et al. | |
| 6,261,484 B1 | 7/2001 | Phillips et al. | |
| 6,274,110 B1 | 8/2001 | Kim et al. | |
| 6,329,628 B1 | 12/2001 | Kuo et al. | |
| 6,334,882 B1 | 1/2002 | Aaslund | |
| 6,362,449 B1 | 3/2002 | Hadidi et al. | |
| 6,376,027 B1 | 4/2002 | Lee et al. | |
| 6,409,851 B1 | 6/2002 | Sethuram et al. | |
| 6,428,600 B1 | 8/2002 | Flurschuetz et al. | |
| 6,543,380 B1 | 4/2003 | Sung-Spitzl | |
| 6,551,377 B1 | 4/2003 | Leonhardt | |
| 6,569,397 B1 | 5/2003 | Yadav et al. | |
| 6,579,573 B2 | 6/2003 | Strutt et al. | |
| 6,589,311 B1 | 7/2003 | Han et al. | |
| 6,607,693 B1 | 8/2003 | Saito et al. | |
| 6,652,822 B2 | 11/2003 | Phillips et al. | |
| 6,676,728 B2 | 1/2004 | Han et al. | |
| 6,689,192 B1 | 2/2004 | Phillips et al. | |
| 6,752,979 B1 | 6/2004 | Talbot et al. | |
| 6,755,886 B2 | 6/2004 | Phillips et al. | |
| 6,780,219 B2 | 8/2004 | Singh et al. | |
| 6,793,849 B1 | 9/2004 | Gruen et al. | |
| 6,805,822 B2 | 10/2004 | Takei et al. | |
| 6,838,072 B1 | 1/2005 | Kong et al. | |
| 6,869,550 B2 | 3/2005 | Dorfman et al. | |
| 6,902,745 B2 | 6/2005 | Lee et al. | |
| 6,919,257 B2 | 7/2005 | Gealy et al. | |
| 6,919,527 B2 | 7/2005 | Boulos et al. | |
| 6,989,529 B2 | 1/2006 | Wiseman | |
| 7,066,980 B2 | 6/2006 | Akimoto et al. | |
| 7,091,441 B1 | 8/2006 | Kuo | |
| 7,108,733 B2 | 9/2006 | Enokido | |
| 7,125,537 B2 | 10/2006 | Liao et al. | |
| 7,125,822 B2 | 10/2006 | Nakano et al. | |
| 7,175,786 B2 | 2/2007 | Celikkaya et al. | |
| 7,182,929 B1 | 2/2007 | Singhal et al. | |
| 7,220,398 B2 | 5/2007 | Sutorik et al. | |
| 7,235,118 B2 | 6/2007 | Bouaricha et al. | |
| 7,285,194 B2 | 10/2007 | Uno et al. | |
| 7,285,307 B2 | 10/2007 | Hohenthanner et al. | |
| 7,297,310 B1 | 11/2007 | Peng et al. | |
| 7,297,892 B2 | 11/2007 | Kelley et al. | |
| 7,344,776 B2 | 3/2008 | Kollmann et al. | |
| 7,357,910 B2 | 4/2008 | Phillips et al. | |
| 7,368,130 B2 | 5/2008 | Kim et al. | |
| 7,374,704 B2 | 5/2008 | Che et al. | |
| 7,375,303 B2 | 5/2008 | Twarog | |
| 7,381,496 B2 | 6/2008 | Onnerud et al. | |
| 7,431,750 B2 | 10/2008 | Liao et al. | |
| 7,442,271 B2 | 10/2008 | Asmussen et al. | |
| 7,491,468 B2 | 2/2009 | Okada et al. | |
| 7,517,513 B2 | 4/2009 | Sarkas et al. | |
| 7,524,353 B2 | 4/2009 | Johnson et al. | |
| 7,534,296 B2 | 5/2009 | Swain et al. | |
| 7,572,315 B2 | 8/2009 | Boulos et al. | |
| 7,622,211 B2 | 11/2009 | Vyas et al. | |
| 7,629,553 B2 | 12/2009 | Fanson et al. | |
| 7,700,152 B2 | 4/2010 | Laine et al. | |
| 7,776,303 B2 | 8/2010 | Hung et al. | |
| 7,806,077 B2 | 10/2010 | Lee et al. | |
| 7,828,999 B2 | 11/2010 | Yubuta et al. | |
| 7,901,658 B2 | 3/2011 | Weppner et al. | |
| 7,931,836 B2 | 4/2011 | Xie et al. | |
| 7,939,141 B2 | 5/2011 | Matthews et al. | |
| 8,007,691 B2 | 8/2011 | Sawaki et al. | |
| 8,043,405 B2 | 10/2011 | Johnson et al. | |
| 8,092,941 B2 | 1/2012 | Weppner et al. | |
| 8,101,061 B2 | 1/2012 | Suh et al. | |
| 8,168,128 B2 | 5/2012 | Seeley et al. | |
| 8,178,240 B2 | 5/2012 | Wang et al. | |
| 8,192,865 B2 | 6/2012 | Buiel et al. | |
| 8,193,291 B2 | 6/2012 | Zhang | |
| 8,211,388 B2 | 7/2012 | Woodfield et al. | |
| 8,268,230 B2 | 9/2012 | Cherepy et al. | |
| 8,283,275 B2 | 10/2012 | Heo et al. | |
| 8,303,926 B1 | 11/2012 | Luhrs et al. | |
| 8,329,090 B2 | 12/2012 | Hollingsworth et al. | |
| 8,329,257 B2 | 12/2012 | Larouche et al. | |
| 8,338,323 B2 | 12/2012 | Takasu et al. | |
| 8,389,160 B2 | 3/2013 | Venkatachalam et al. | |
| 8,420,043 B2 | 4/2013 | Gamo et al. | |

(56) References Cited

U.S. PATENT DOCUMENTS

| | | |
|---|---|---|
| 8,439,998 B2 | 5/2013 | Ito et al. |
| 8,449,950 B2 | 5/2013 | Shang et al. |
| 8,478,785 B2 | 7/2013 | Jamjoom et al. |
| 8,492,303 B2 | 7/2013 | Bulan et al. |
| 8,529,996 B2 | 9/2013 | Bocian et al. |
| 8,592,767 B2 | 11/2013 | Rappe et al. |
| 8,597,722 B2 | 12/2013 | Albano et al. |
| 8,623,555 B2 | 1/2014 | Kang et al. |
| 8,658,317 B2 | 2/2014 | Weppner et al. |
| 8,685,593 B2 | 4/2014 | Dadheech et al. |
| 8,728,680 B2 | 5/2014 | Mikhail et al. |
| 8,735,022 B2 | 5/2014 | Schlag et al. |
| 8,748,785 B2 | 6/2014 | Jordan et al. |
| 8,758,957 B2 | 6/2014 | Dadheech et al. |
| 8,784,706 B2 | 7/2014 | Shevchenko et al. |
| 8,822,000 B2 | 9/2014 | Kumagai et al. |
| 8,840,701 B2 | 9/2014 | Borland et al. |
| 8,877,119 B2 | 11/2014 | Jordan et al. |
| 8,911,529 B2 | 12/2014 | Withers et al. |
| 8,919,428 B2 | 12/2014 | Cola et al. |
| 8,945,431 B2 | 2/2015 | Schulz et al. |
| 8,951,496 B2 | 2/2015 | Hadidi et al. |
| 8,956,785 B2 | 2/2015 | Dadheech et al. |
| 8,968,587 B2 | 3/2015 | Shin et al. |
| 8,968,669 B2 | 3/2015 | Chen |
| 8,980,485 B2 | 3/2015 | Lanning et al. |
| 8,999,440 B2 | 4/2015 | Zenasni et al. |
| 9,023,259 B2 | 5/2015 | Hadidi et al. |
| 9,051,647 B2 | 6/2015 | Cooperberg et al. |
| 9,065,141 B2 | 6/2015 | Merzougui et al. |
| 9,067,264 B2 | 6/2015 | Moxson et al. |
| 9,079,778 B2 | 7/2015 | Kelley et al. |
| 9,085,490 B2 | 7/2015 | Taylor et al. |
| 9,101,982 B2 | 8/2015 | Aslund |
| 9,136,569 B2 | 9/2015 | Song et al. |
| 9,150,422 B2 | 10/2015 | Nakayama et al. |
| 9,193,133 B2 | 11/2015 | Shin et al. |
| 9,196,901 B2 | 11/2015 | Se-Hee et al. |
| 9,196,905 B2 | 11/2015 | Tzeng et al. |
| 9,206,085 B2 | 12/2015 | Hadidi et al. |
| 9,242,224 B2 | 1/2016 | Redjdal et al. |
| 9,259,785 B2 | 2/2016 | Hadidi et al. |
| 9,293,302 B2 | 3/2016 | Risby et al. |
| 9,321,071 B2 | 4/2016 | Jordan et al. |
| 9,322,081 B2 | 4/2016 | McHugh et al. |
| 9,352,278 B2 | 5/2016 | Spatz et al. |
| 9,356,281 B2 | 5/2016 | Verbrugge et al. |
| 9,368,772 B1 | 6/2016 | Chen et al. |
| 9,378,928 B2 | 6/2016 | Zeng et al. |
| 9,412,998 B2 | 8/2016 | Rojeski et al. |
| 9,421,612 B2 | 8/2016 | Fang et al. |
| 9,425,463 B2 | 8/2016 | Hsu et al. |
| 9,463,435 B2 | 10/2016 | Schulz et al. |
| 9,463,984 B2 | 10/2016 | Sun et al. |
| 9,520,593 B2 | 12/2016 | Sun et al. |
| 9,520,600 B2 | 12/2016 | Dadheech et al. |
| 9,624,565 B2 | 4/2017 | Lee et al. |
| 9,630,162 B1 | 4/2017 | Sunkara et al. |
| 9,643,891 B2 | 5/2017 | Hadidi et al. |
| 9,700,877 B2 | 7/2017 | Kim et al. |
| 9,705,136 B2 | 7/2017 | Rojeski |
| 9,718,131 B2 | 8/2017 | Boulos et al. |
| 9,735,427 B2 | 8/2017 | Zhang |
| 9,738,788 B1 | 8/2017 | Gross et al. |
| 9,751,129 B2 | 9/2017 | Boulos et al. |
| 9,767,990 B2 | 9/2017 | Zeng et al. |
| 9,768,033 B2 | 9/2017 | Ranjan et al. |
| 9,776,378 B2 | 10/2017 | Choi |
| 9,782,791 B2 | 10/2017 | Redjdal et al. |
| 9,782,828 B2 | 10/2017 | Wilkinson |
| 9,796,019 B2 | 10/2017 | She et al. |
| 9,796,020 B2 | 10/2017 | Aslund |
| 9,831,503 B2 | 11/2017 | Sopchak |
| 9,871,248 B2 | 1/2018 | Rayner et al. |
| 9,879,344 B2 | 1/2018 | Lee et al. |
| 9,899,674 B2 | 2/2018 | Hirai et al. |
| 9,917,299 B2 | 3/2018 | Behan et al. |
| 9,932,673 B2 | 4/2018 | Jordan et al. |
| 9,945,034 B2 | 4/2018 | Yao et al. |
| 9,945,564 B2 | 4/2018 | Gao et al. |
| 9,947,926 B2 | 4/2018 | Kim et al. |
| 9,981,284 B2 | 5/2018 | Guo et al. |
| 9,991,458 B2 | 6/2018 | Rosenman et al. |
| 9,999,922 B1 | 6/2018 | Struve |
| 10,011,491 B2 | 7/2018 | Lee et al. |
| 10,050,303 B2 | 8/2018 | Anandan et al. |
| 10,057,986 B2 | 8/2018 | Prud'Homme et al. |
| 10,065,240 B2 | 9/2018 | Chen |
| 10,079,392 B2 | 9/2018 | Huang et al. |
| 10,116,000 B1 | 10/2018 | Federici et al. |
| 10,130,994 B2 | 11/2018 | Fang et al. |
| 10,167,556 B2 | 1/2019 | Ruzic et al. |
| 10,170,753 B2 | 1/2019 | Ren et al. |
| 10,193,142 B2 | 1/2019 | Rojeski |
| 10,244,614 B2 | 3/2019 | Foret |
| 10,279,531 B2 | 5/2019 | Pagliarini |
| 10,283,757 B2 | 5/2019 | Noh et al. |
| 10,319,537 B2 | 6/2019 | Claussen et al. |
| 10,333,183 B2 | 6/2019 | Sloop |
| 10,350,680 B2 | 7/2019 | Yamamoto et al. |
| 10,403,475 B2 | 9/2019 | Cooperberg et al. |
| 10,411,253 B2 | 9/2019 | Tzeng et al. |
| 10,439,206 B2 | 10/2019 | Behan et al. |
| 10,442,000 B2 | 10/2019 | Fukada et al. |
| 10,461,298 B2 | 10/2019 | Herle |
| 10,477,665 B2 | 11/2019 | Hadidi et al. |
| 10,493,524 B2 | 12/2019 | She et al. |
| 10,522,300 B2 | 12/2019 | Yang |
| 10,526,684 B2 | 1/2020 | Ekman et al. |
| 10,529,486 B2 | 1/2020 | Nishisaka |
| 10,543,534 B2 | 1/2020 | Hadidi et al. |
| 10,584,923 B2 | 3/2020 | De et al. |
| 10,593,985 B2 | 3/2020 | Sastry et al. |
| 10,610,929 B2 | 4/2020 | Fang et al. |
| 10,637,029 B2 | 4/2020 | Gotlib Vainshtein et al. |
| 10,638,592 B2 | 4/2020 | Foret |
| 10,639,712 B2 | 5/2020 | Barnes et al. |
| 10,647,824 B2 | 5/2020 | Hwang et al. |
| 10,655,206 B2 | 5/2020 | Moon et al. |
| 10,665,890 B2 | 5/2020 | Kang et al. |
| 10,668,566 B2 | 6/2020 | Smathers et al. |
| 10,669,437 B2 | 6/2020 | Cox et al. |
| 10,688,564 B2 | 6/2020 | Boulos et al. |
| 10,707,477 B2 | 7/2020 | Sastry et al. |
| 10,717,150 B2 | 7/2020 | Aleksandrov et al. |
| 10,727,477 B2 | 7/2020 | Kim et al. |
| 10,741,845 B2 | 8/2020 | Yushin et al. |
| 10,744,590 B2 | 8/2020 | Maier et al. |
| 10,756,334 B2 | 8/2020 | Stowell et al. |
| 10,766,787 B1 | 9/2020 | Sunkara et al. |
| 10,777,804 B2 | 9/2020 | Sastry et al. |
| 10,858,255 B2 | 12/2020 | Koziol et al. |
| 10,858,500 B2 | 12/2020 | Chen et al. |
| 10,892,477 B2 | 1/2021 | Choi et al. |
| 10,930,473 B2 | 2/2021 | Paukner et al. |
| 10,930,922 B2 | 2/2021 | Sun et al. |
| 10,937,632 B2 | 3/2021 | Stowell et al. |
| 10,943,744 B2 | 3/2021 | Sungail et al. |
| 10,944,093 B2 | 3/2021 | Paz et al. |
| 10,950,856 B2 | 3/2021 | Park et al. |
| 10,964,938 B2 | 3/2021 | Rojeski |
| 10,987,735 B2 | 4/2021 | Hadidi et al. |
| 10,998,552 B2 | 5/2021 | Lanning et al. |
| 11,011,388 B2 | 5/2021 | Eason et al. |
| 11,031,641 B2 | 6/2021 | Gupta et al. |
| 11,050,061 B2 | 6/2021 | Kim et al. |
| 11,072,533 B2 | 7/2021 | Shevchenko et al. |
| 11,077,497 B2 | 8/2021 | Motchenbacher et al. |
| 11,077,524 B2 | 8/2021 | Smathers et al. |
| 11,108,050 B2 | 8/2021 | Kim et al. |
| 11,116,000 B2 | 9/2021 | Sandberg et al. |
| 11,130,175 B2 | 9/2021 | Parrish et al. |
| 11,130,994 B2 | 9/2021 | Shachar et al. |
| 11,133,495 B2 | 9/2021 | Gazda et al. |

(56) References Cited

U.S. PATENT DOCUMENTS

| | | |
|---|---|---|
| 11,148,202 B2 | 10/2021 | Hadidi et al. |
| 11,167,556 B2 | 11/2021 | Shimada et al. |
| 11,170,753 B2 | 11/2021 | Nomura et al. |
| 11,171,322 B2 | 11/2021 | Seol et al. |
| 11,183,682 B2 | 11/2021 | Sunkara et al. |
| 11,193,142 B2 | 12/2021 | Angelidaki et al. |
| 11,196,045 B2 | 12/2021 | Dadheech et al. |
| 11,219,884 B2 | 1/2022 | Takeda et al. |
| 11,244,614 B2 | 2/2022 | He et al. |
| 11,245,065 B1 | 2/2022 | Ouderkirk et al. |
| 11,245,109 B2 | 2/2022 | Tzeng et al. |
| 11,254,585 B2 | 2/2022 | Ekman et al. |
| 11,273,322 B2 | 3/2022 | Zanata et al. |
| 11,273,491 B2 | 3/2022 | Barnes et al. |
| 11,299,397 B2 | 4/2022 | Lanning et al. |
| 11,311,937 B2 | 4/2022 | Hadidi et al. |
| 11,311,938 B2 | 4/2022 | Badwe et al. |
| 11,319,537 B2 | 5/2022 | Dames et al. |
| 11,333,183 B2 | 5/2022 | Desai et al. |
| 11,335,911 B2 | 5/2022 | Lanning et al. |
| 11,350,680 B2 | 6/2022 | Rutkoski et al. |
| 11,411,253 B2 | 8/2022 | Busacca et al. |
| 11,439,206 B2 | 9/2022 | Santos |
| 11,442,000 B2 | 9/2022 | Vaez-Iravani et al. |
| 11,461,298 B1 | 10/2022 | Shemmer et al. |
| 11,465,201 B2 | 10/2022 | Barnes et al. |
| 11,471,941 B2 | 10/2022 | Barnes et al. |
| 11,477,665 B2 | 10/2022 | Franke et al. |
| 11,577,314 B2 | 2/2023 | Hadidi et al. |
| 11,590,568 B2 | 2/2023 | Badwe et al. |
| 11,611,130 B2 | 3/2023 | Wrobel et al. |
| 11,633,785 B2 | 4/2023 | Badwe et al. |
| 11,654,483 B2 | 5/2023 | Larouche et al. |
| 11,717,886 B2 | 8/2023 | Badwe et al. |
| 11,839,919 B2 | 12/2023 | Hadidi et al. |
| 11,919,071 B2 | 3/2024 | Badwe et al. |
| 11,923,176 B2 | 3/2024 | Stowell et al. |
| 11,963,287 B2 | 4/2024 | Shang et al. |
| 2001/0016283 A1 | 8/2001 | Shiraishi et al. |
| 2001/0021740 A1 | 9/2001 | Lodyga et al. |
| 2002/0054912 A1 | 5/2002 | Kim et al. |
| 2002/0112794 A1 | 8/2002 | Sethuram et al. |
| 2003/0024806 A1 | 2/2003 | Foret |
| 2003/0027021 A1 | 2/2003 | Sharivker et al. |
| 2003/0070620 A1 | 4/2003 | Cooperberg et al. |
| 2003/0077398 A1 | 4/2003 | Strutt et al. |
| 2003/0129497 A1 | 7/2003 | Yamamoto et al. |
| 2003/0172772 A1 | 9/2003 | Sethuram et al. |
| 2003/0186128 A1 | 10/2003 | Singh et al. |
| 2003/0207978 A1 | 11/2003 | Yadav et al. |
| 2004/0013941 A1 | 1/2004 | Kobayashi et al. |
| 2004/0045807 A1 | 3/2004 | Sarkas et al. |
| 2004/0060387 A1 | 4/2004 | Tanner-Jones |
| 2004/0123699 A1 | 7/2004 | Liao et al. |
| 2004/0247522 A1 | 12/2004 | Mills |
| 2005/0005844 A1 | 1/2005 | Kitagawa et al. |
| 2005/0025698 A1 | 2/2005 | Talbot et al. |
| 2005/0072496 A1 | 4/2005 | Hwang et al. |
| 2005/0163696 A1 | 7/2005 | Uhm et al. |
| 2005/0242070 A1 | 11/2005 | Hammer |
| 2005/0260786 A1 | 11/2005 | Yoshikawa et al. |
| 2006/0040168 A1 | 2/2006 | Sridhar |
| 2006/0040182 A1 | 2/2006 | Kawakami et al. |
| 2006/0141153 A1 | 6/2006 | Kubota et al. |
| 2006/0145124 A1 | 7/2006 | Hsiao et al. |
| 2006/0291827 A1 | 12/2006 | Suib et al. |
| 2007/0077350 A1 | 4/2007 | Hohenthanner et al. |
| 2007/0089860 A1 | 4/2007 | Hou et al. |
| 2007/0092432 A1 | 4/2007 | Prud et al. |
| 2007/0209758 A1 | 9/2007 | Sompalli et al. |
| 2007/0221635 A1 | 9/2007 | Boulos et al. |
| 2007/0259768 A1 | 11/2007 | Kear et al. |
| 2008/0029485 A1 | 2/2008 | Kelley et al. |
| 2008/0055594 A1 | 3/2008 | Hadidi et al. |
| 2008/0182114 A1 | 7/2008 | Kim et al. |
| 2008/0220244 A1 | 9/2008 | Wai et al. |
| 2008/0286490 A1 | 11/2008 | Bogdanoff et al. |
| 2008/0296268 A1 | 12/2008 | Mike et al. |
| 2008/0305025 A1 | 12/2008 | Vitner et al. |
| 2009/0074655 A1 | 3/2009 | Suciu |
| 2009/0093553 A1 | 4/2009 | Kleine et al. |
| 2009/0155689 A1 | 6/2009 | Zaghib et al. |
| 2009/0196801 A1 | 8/2009 | Mills |
| 2009/0202869 A1 | 8/2009 | Sawaki et al. |
| 2009/0246398 A1 | 10/2009 | Kurahashi et al. |
| 2009/0258255 A1 | 10/2009 | Terashima et al. |
| 2009/0266487 A1 | 10/2009 | Tian et al. |
| 2009/0304941 A1 | 12/2009 | McLean |
| 2009/0305132 A1 | 12/2009 | Gauthier et al. |
| 2010/0007162 A1 | 1/2010 | Han et al. |
| 2010/0096362 A1 | 4/2010 | Hirayama et al. |
| 2010/0176524 A1 | 7/2010 | Burgess et al. |
| 2010/0219062 A1 | 9/2010 | Leon Sanchez |
| 2011/0005461 A1 | 1/2011 | Vandermeulen |
| 2011/0006254 A1 | 1/2011 | Richard et al. |
| 2012/0015284 A1 | 1/2012 | Merzougui et al. |
| 2012/0027955 A1 | 2/2012 | Sunkara et al. |
| 2012/0034135 A1 | 2/2012 | Risby |
| 2012/0048064 A1 | 3/2012 | Kasper et al. |
| 2012/0051962 A1 | 3/2012 | Imam et al. |
| 2012/0074342 A1 | 3/2012 | Kim et al. |
| 2012/0100438 A1 | 4/2012 | Fasching et al. |
| 2012/0112379 A1 | 5/2012 | Beppu et al. |
| 2012/0122017 A1 | 5/2012 | Mills |
| 2012/0224175 A1 | 9/2012 | Minghetti |
| 2012/0230860 A1 | 9/2012 | Ward-Close et al. |
| 2012/0240726 A1 | 9/2012 | Kim et al. |
| 2012/0294919 A1 | 11/2012 | Jaynes et al. |
| 2013/0032753 A1 | 2/2013 | Yamamoto et al. |
| 2013/0071284 A1 | 3/2013 | Kano et al. |
| 2013/0075390 A1 | 3/2013 | Ashida |
| 2013/0078508 A1 | 3/2013 | Tolbert et al. |
| 2013/0084474 A1 | 4/2013 | Mills |
| 2013/0087285 A1 | 4/2013 | Kofuji et al. |
| 2014/0048516 A1 | 2/2014 | Gorodetsky et al. |
| 2014/0202286 A1 | 7/2014 | Yokoyama et al. |
| 2014/0271843 A1 | 9/2014 | Ma et al. |
| 2014/0272430 A1 | 9/2014 | Kalayaraman |
| 2014/0322632 A1 | 10/2014 | Sugimoto et al. |
| 2014/0373344 A1 | 12/2014 | Takada et al. |
| 2015/0000844 A1 | 1/2015 | Woo |
| 2015/0101454 A1 | 4/2015 | Shimizu et al. |
| 2015/0167143 A1 | 6/2015 | Luce et al. |
| 2015/0171455 A1 | 6/2015 | Mills |
| 2015/0255767 A1 | 9/2015 | Aetukuri et al. |
| 2015/0259220 A1 | 9/2015 | Rosocha et al. |
| 2015/0270106 A1 | 9/2015 | Kobayashi et al. |
| 2015/0333307 A1 | 11/2015 | Thokchom et al. |
| 2015/0342491 A1 | 12/2015 | Marecki et al. |
| 2015/0351652 A1 | 12/2015 | Marecki et al. |
| 2016/0028088 A1 | 1/2016 | Romeo et al. |
| 2016/0030359 A1 | 2/2016 | Ma et al. |
| 2016/0045841 A1 | 2/2016 | Kaplan et al. |
| 2016/0152480 A1 | 6/2016 | Jang et al. |
| 2016/0172163 A1 | 6/2016 | Kaneko et al. |
| 2016/0189933 A1 | 6/2016 | Kobayashi et al. |
| 2016/0197341 A1 | 7/2016 | Lu et al. |
| 2016/0254540 A1 | 9/2016 | Lee et al. |
| 2016/0284519 A1 | 9/2016 | Kobayashi et al. |
| 2016/0285090 A1 | 9/2016 | Ozkan et al. |
| 2016/0287113 A1 | 10/2016 | Hebert et al. |
| 2016/0308244 A1 | 10/2016 | Badding et al. |
| 2016/0332232 A1 | 11/2016 | Forbes et al. |
| 2016/0351910 A1 | 12/2016 | Albano et al. |
| 2016/0358757 A1 | 12/2016 | Ikeda et al. |
| 2017/0009328 A1 | 1/2017 | Germann et al. |
| 2017/0070180 A1 | 3/2017 | Mills |
| 2017/0113935 A1 | 4/2017 | Pennington et al. |
| 2017/0120339 A1 | 5/2017 | Aslund |
| 2017/0125842 A1 | 5/2017 | Meguro et al. |
| 2017/0151609 A1 | 6/2017 | Elsen et al. |
| 2017/0176977 A1 | 6/2017 | Huang et al. |
| 2017/0179477 A1 | 6/2017 | Walters et al. |
| 2017/0209922 A1 | 7/2017 | Kato et al. |

(56) References Cited

U.S. PATENT DOCUMENTS

| | | |
|---|---|---|
| 2017/0338464 A1 | 11/2017 | Fasching et al. |
| 2017/0368604 A1 | 12/2017 | Wilkinson |
| 2017/0373344 A1 | 12/2017 | Hadidi et al. |
| 2018/0022928 A1 | 1/2018 | Blush |
| 2018/0025794 A1 | 1/2018 | Lahoda et al. |
| 2018/0083264 A1 | 3/2018 | Soppe |
| 2018/0104745 A1 | 4/2018 | L'Esperance et al. |
| 2018/0114677 A1 | 4/2018 | Komatsu et al. |
| 2018/0130638 A1 | 5/2018 | Ahmad et al. |
| 2018/0134629 A1 | 5/2018 | Kolios et al. |
| 2018/0138018 A1 | 5/2018 | Voronin et al. |
| 2018/0159178 A1 | 6/2018 | Weisenstein et al. |
| 2018/0169763 A1 | 6/2018 | Dorval et al. |
| 2018/0214956 A1 | 8/2018 | Larouche et al. |
| 2018/0218883 A1 | 8/2018 | Iwao |
| 2018/0241956 A1 | 8/2018 | Suzuki |
| 2018/0248175 A1 | 8/2018 | Ghezelbash et al. |
| 2018/0277826 A1 | 9/2018 | Gayden et al. |
| 2018/0277849 A1 | 9/2018 | Gayden |
| 2018/0294143 A1 | 10/2018 | Chua et al. |
| 2018/0346344 A1 | 12/2018 | Chen et al. |
| 2018/0353643 A1 | 12/2018 | Ma et al. |
| 2018/0363104 A1 | 12/2018 | Fujieda et al. |
| 2018/0366707 A1 | 12/2018 | Johnson et al. |
| 2018/0375149 A1 | 12/2018 | Beck et al. |
| 2019/0001416 A1 | 1/2019 | Larouche et al. |
| 2019/0061005 A1 | 2/2019 | Kelkar |
| 2019/0069944 A1 | 3/2019 | Fischer |
| 2019/0084290 A1 | 3/2019 | Stoyanov et al. |
| 2019/0088993 A1 | 3/2019 | Ohta |
| 2019/0125842 A1 | 5/2019 | Grabowski |
| 2019/0127835 A1 | 5/2019 | Yang et al. |
| 2019/0157045 A1 | 5/2019 | Meloni |
| 2019/0160528 A1 | 5/2019 | McGee et al. |
| 2019/0165413 A1 | 5/2019 | Furusawa |
| 2019/0173130 A1 | 6/2019 | Schuhmacher et al. |
| 2019/0193151 A1 | 6/2019 | Okumura et al. |
| 2019/0218650 A1 | 7/2019 | Subramanian et al. |
| 2019/0271068 A1 | 9/2019 | Sungail et al. |
| 2019/0292441 A1 | 9/2019 | Hill et al. |
| 2019/0334206 A1 | 10/2019 | Sastry et al. |
| 2019/0341650 A9 | 11/2019 | Lanning et al. |
| 2019/0348202 A1 | 11/2019 | Sachdev et al. |
| 2019/0362936 A1 | 11/2019 | Van Den Berg et al. |
| 2019/0389734 A1 | 12/2019 | Dietz et al. |
| 2020/0067128 A1 | 2/2020 | Chmiola et al. |
| 2020/0136176 A1 | 4/2020 | Chen |
| 2020/0149146 A1 | 5/2020 | Chen et al. |
| 2020/0153037 A1 | 5/2020 | Renna et al. |
| 2020/0187607 A1 | 6/2020 | Law |
| 2020/0198977 A1 | 6/2020 | Hof et al. |
| 2020/0203706 A1 | 6/2020 | Holman et al. |
| 2020/0207668 A1 | 7/2020 | Cavalli et al. |
| 2020/0220222 A1 | 7/2020 | Watarai et al. |
| 2020/0223704 A1 | 7/2020 | Neale et al. |
| 2020/0227728 A1 | 7/2020 | Huang et al. |
| 2020/0254432 A1 | 8/2020 | Shirman et al. |
| 2020/0276638 A1 | 9/2020 | King et al. |
| 2020/0288561 A1 | 9/2020 | Huh |
| 2020/0314991 A1 | 10/2020 | Duanmu et al. |
| 2020/0335754 A1 | 10/2020 | Ramasubramanian et al. |
| 2020/0335781 A1 | 10/2020 | Oshita et al. |
| 2020/0350565 A1 | 11/2020 | Oshita et al. |
| 2020/0358093 A1 | 11/2020 | Oshita et al. |
| 2020/0358096 A1 | 11/2020 | Paulsen et al. |
| 2020/0381217 A1 | 12/2020 | Kraus et al. |
| 2020/0388857 A1 | 12/2020 | Sunkara et al. |
| 2020/0391295 A1 | 12/2020 | Dorval et al. |
| 2020/0395607 A1 | 12/2020 | Tzeng |
| 2020/0403236 A1 | 12/2020 | Colwell |
| 2020/0407858 A1 | 12/2020 | Sano et al. |
| 2021/0002759 A1 | 1/2021 | Zhang et al. |
| 2021/0024358 A1 | 1/2021 | Chae et al. |
| 2021/0047186 A1 | 2/2021 | Ifuku et al. |
| 2021/0057191 A1 | 2/2021 | Stowell et al. |
| 2021/0075000 A1 | 3/2021 | Holman et al. |
| 2021/0085468 A1 | 3/2021 | Ryd et al. |
| 2021/0098826 A1 | 4/2021 | Chung et al. |
| 2021/0139331 A1 | 5/2021 | Kang et al. |
| 2021/0187614 A1 | 6/2021 | Tsubota et al. |
| 2021/0226302 A1 | 7/2021 | Lanning et al. |
| 2021/0253430 A1 | 8/2021 | Zaplotnik et al. |
| 2021/0273217 A1 | 9/2021 | Park et al. |
| 2021/0273292 A1 | 9/2021 | Yun et al. |
| 2021/0276094 A1 | 9/2021 | Sobu et al. |
| 2021/0296731 A1 | 9/2021 | Wrobel et al. |
| 2021/0310110 A1 | 10/2021 | Stowell et al. |
| 2021/0339313 A1 | 11/2021 | Motchenbacher et al. |
| 2021/0344059 A1 | 11/2021 | Ekman et al. |
| 2021/0367264 A1 | 11/2021 | Hadidi et al. |
| 2022/0041457 A1 | 2/2022 | Pullen et al. |
| 2022/0063012 A1 | 3/2022 | Murata et al. |
| 2022/0127145 A1 | 4/2022 | Ding et al. |
| 2022/0134430 A1 | 5/2022 | Larouche et al. |
| 2022/0143693 A1 | 5/2022 | Larouche et al. |
| 2022/0209298 A1 | 6/2022 | Kim et al. |
| 2022/0223379 A1 | 7/2022 | Holman et al. |
| 2022/0228288 A1 | 7/2022 | Holman et al. |
| 2022/0267216 A1 | 8/2022 | Holman et al. |
| 2022/0314325 A1 | 10/2022 | Badwe |
| 2022/0324022 A1 | 10/2022 | Badwe |
| 2022/0352549 A1 | 11/2022 | Kim et al. |
| 2023/0001375 A1 | 1/2023 | Kozlowski et al. |
| 2023/0001376 A1 | 1/2023 | Kozlowski et al. |
| 2023/0025008 A1 | 1/2023 | Lee et al. |
| 2023/0032362 A1 | 2/2023 | Holman et al. |
| 2023/0100863 A1 | 3/2023 | Llanto et al. |
| 2023/0143022 A1 | 5/2023 | Mills |
| 2023/0144075 A1 | 5/2023 | Badwe et al. |
| 2023/0211407 A1 | 7/2023 | Hadidi |
| 2023/0219134 A1 | 7/2023 | Houshmand et al. |
| 2023/0245896 A1 | 8/2023 | Gupta et al. |
| 2023/0247751 A1 | 8/2023 | Kozlowski et al. |
| 2023/0298885 A1 | 9/2023 | Borude et al. |
| 2023/0330747 A1 | 10/2023 | Barnes et al. |
| 2023/0330748 A1 | 10/2023 | Badwe et al. |
| 2023/0377848 A1 | 11/2023 | Holman et al. |
| 2023/0395889 A1 | 12/2023 | Yang et al. |
| 2023/0411123 A1 | 12/2023 | Kozlowski et al. |
| 2024/0017322 A1 | 1/2024 | Badwe et al. |
| 2024/0057245 A1 | 2/2024 | Kozlowski et al. |
| 2024/0071725 A1 | 2/2024 | Kozlowsk et al. |
| 2024/0088467 A1 | 3/2024 | Liao et al. |

FOREIGN PATENT DOCUMENTS

| | | |
|---|---|---|
| CA | 2947531 A1 | 11/2015 |
| CN | 1188073 A | 7/1998 |
| CN | 1653869 A | 8/2005 |
| CN | 1675785 A | 9/2005 |
| CN | 1967911 A | 5/2007 |
| CN | 101191204 A | 6/2008 |
| CN | 101391307 A | 3/2009 |
| CN | 101728509 A | 6/2010 |
| CN | 101804962 A | 8/2010 |
| CN | 101716686 B | 2/2011 |
| CN | 102179521 A | 9/2011 |
| CN | 102328961 A | 1/2012 |
| CN | 102394290 A | 3/2012 |
| CN | 102412377 A | 4/2012 |
| CN | 102427130 A | 4/2012 |
| CN | 102664273 A | 9/2012 |
| CN | 102723502 A | 10/2012 |
| CN | 102867940 A | 1/2013 |
| CN | 102983312 A | 3/2013 |
| CN | 103121105 A | 5/2013 |
| CN | 103402921 A | 11/2013 |
| CN | 102554242 B | 12/2013 |
| CN | 103456926 A | 12/2013 |
| CN | 103682372 A | 3/2014 |
| CN | 103682383 A | 3/2014 |
| CN | 103700815 A | 4/2014 |
| CN | 103874538 A | 6/2014 |
| CN | 103956520 A | 7/2014 |

(56) References Cited

FOREIGN PATENT DOCUMENTS

| | | |
|---|---|---|
| CN | 104064736 A | 9/2014 |
| CN | 104084592 A | 10/2014 |
| CN | 104209526 | 12/2014 |
| CN | 104218213 A | 12/2014 |
| CN | 204156003 U | 2/2015 |
| CN | 104485452 A | 4/2015 |
| CN | 104752734 A | 7/2015 |
| CN | 104772473 A | 7/2015 |
| CN | 103515590 B | 9/2015 |
| CN | 105514373 A | 4/2016 |
| CN | 106001597 A | 10/2016 |
| CN | 106044777 A | 10/2016 |
| CN | 106159316 A | 11/2016 |
| CN | 106216703 A | 12/2016 |
| CN | 106450146 A | 2/2017 |
| CN | 106493350 A | 3/2017 |
| CN | 206040854 U | 3/2017 |
| CN | 106684387 A | 5/2017 |
| CN | 106756417 A | 5/2017 |
| CN | 106784692 A | 5/2017 |
| CN | 107093732 A | 8/2017 |
| CN | 107170973 A | 9/2017 |
| CN | 107579241 A | 1/2018 |
| CN | 107931622 A | 4/2018 |
| CN | 108134104 A | 6/2018 |
| CN | 108145170 A | 6/2018 |
| CN | 108217612 A | 6/2018 |
| CN | 108649190 A | 10/2018 |
| CN | 108666563 A | 10/2018 |
| CN | 108672709 A | 10/2018 |
| CN | 108878862 A | 11/2018 |
| CN | 108907210 A | 11/2018 |
| CN | 108933239 A | 12/2018 |
| CN | 108963239 A | 12/2018 |
| CN | 109167070 A | 1/2019 |
| CN | 109301212 A | 2/2019 |
| CN | 109616622 A | 4/2019 |
| CN | 109742320 A | 5/2019 |
| CN | 109808049 A | 5/2019 |
| CN | 109888233 A | 6/2019 |
| CN | 110153434 A | 8/2019 |
| CN | 110218897 A | 9/2019 |
| CN | 110299516 A | 10/2019 |
| CN | 110790263 A | 2/2020 |
| CN | 110993908 A | 4/2020 |
| CN | 111099577 A | 5/2020 |
| CN | 111342163 A | 6/2020 |
| CN | 111370751 A | 7/2020 |
| CN | 111403701 A | 7/2020 |
| CN | 111515391 A | 8/2020 |
| CN | 111970807 A | 11/2020 |
| CN | 112259740 A | 1/2021 |
| CN | 112331947 A | 2/2021 |
| CN | 112397706 A | 2/2021 |
| CN | 112421006 A | 2/2021 |
| CN | 112421048 A | 2/2021 |
| CN | 112447977 A | 3/2021 |
| CN | 112768709 A | 5/2021 |
| CN | 112768710 A | 5/2021 |
| CN | 112768711 A | 5/2021 |
| CN | 112864453 A | 5/2021 |
| CN | 113097487 A | 7/2021 |
| CN | 113104838 A | 7/2021 |
| CN | 113764688 A | 12/2021 |
| CN | 113871581 A | 12/2021 |
| CN | 114388822 A | 4/2022 |
| CN | 114744315 A | 7/2022 |
| CN | 114824297 A | 7/2022 |
| CN | 115394976 A | 11/2022 |
| DE | 10335355 A1 | 11/2004 |
| DE | 102009033251 A1 | 9/2010 |
| DE | 102010006440 A1 | 8/2011 |
| DE | 102011109137 A1 | 2/2013 |
| DE | 102018132896 A1 | 6/2020 |
| EP | 0256233 A2 | 2/1988 |
| EP | 2292557 A1 | 3/2011 |
| EP | 3143838 A1 | 3/2017 |
| EP | 3474978 A1 | 5/2019 |
| FR | 2525122 A1 | 10/1983 |
| FR | 2591412 A1 | 6/1987 |
| GB | 2595745 A | 12/2021 |
| GB | 2620597 A | 1/2024 |
| IN | 202011017775 | 10/2021 |
| JP | 63-243212 A | 10/1988 |
| JP | 10-172564 A | 6/1998 |
| JP | 10-296446 A | 11/1998 |
| JP | 11-064556 A | 3/1999 |
| JP | 2001-064703 A | 3/2001 |
| JP | 2001-504753 A | 4/2001 |
| JP | 2001-348296 A | 12/2001 |
| JP | 2002-249836 A | 9/2002 |
| JP | 2002-332531 A | 11/2002 |
| JP | 2004-034014 A | 2/2004 |
| JP | 2004-505761 A | 2/2004 |
| JP | 2004-193115 A | 7/2004 |
| JP | 2004-232084 A | 8/2004 |
| JP | 2004-311297 A | 11/2004 |
| JP | 2004-340414 A | 12/2004 |
| JP | 2004-362895 A | 12/2004 |
| JP | 2005-015282 A | 1/2005 |
| JP | 2005-072015 A | 3/2005 |
| JP | 2005-076052 A | 3/2005 |
| JP | 2005-135755 A | 5/2005 |
| JP | 2005-187295 A | 7/2005 |
| JP | 2005-222956 A | 8/2005 |
| JP | 2005-272284 A | 10/2005 |
| JP | 2006-040722 | 2/2006 |
| JP | 2007-113120 | 5/2007 |
| JP | 2007-138287 | 6/2007 |
| JP | 2007-149513 | 6/2007 |
| JP | 2007-238402 | 9/2007 |
| JP | 2008-230905 L | 10/2008 |
| JP | 2008-243447 | 10/2008 |
| JP | 2009-187754 | 8/2009 |
| JP | 2010-024506 | 2/2010 |
| JP | 2010-097914 | 4/2010 |
| JP | 2010-135336 A | 6/2010 |
| JP | 2011-108406 | 6/2011 |
| JP | 2011-222323 A | 11/2011 |
| JP | 2011-258348 A | 12/2011 |
| JP | 2012-046393 A | 3/2012 |
| JP | 2012-151052 A | 8/2012 |
| JP | 2012-234788 A | 11/2012 |
| JP | 2013-062242 A | 4/2013 |
| JP | 2013-063539 A | 4/2013 |
| JP | 2013-069602 A | 4/2013 |
| JP | 2013-076130 A | 4/2013 |
| JP | 2015-048269 A | 3/2015 |
| JP | 2015-122218 A | 7/2015 |
| JP | 2016-029193 A | 3/2016 |
| JP | 2016-047961 A | 4/2016 |
| JP | 6103499 B2 | 3/2017 |
| JP | 2017-524628 A | 8/2017 |
| JP | 2018-141762 A | 9/2018 |
| JP | 2018-528328 A | 9/2018 |
| JP | 2018-190563 A | 11/2018 |
| JP | 2019-055898 A | 4/2019 |
| JP | 2019-516020 A | 6/2019 |
| JP | 2019-112699 A | 7/2019 |
| JP | 2019-520894 A | 7/2019 |
| JP | 2020-121898 A | 8/2020 |
| JP | 2021-061089 A | 4/2021 |
| JP | 2021-061090 A | 4/2021 |
| JP | 2021-116191 A | 8/2021 |
| JP | 2022-530649 A | 6/2022 |
| KR | 10-0582507 B1 | 5/2006 |
| KR | 10-2007-0076676 A | 7/2007 |
| KR | 10-2009-0070140 A | 7/2009 |
| KR | 10-1133094 B1 | 4/2012 |
| KR | 10-2014-0001813 U | 3/2014 |
| KR | 20-2014-0001813 U | 3/2014 |
| KR | 10-1684219 B1 | 12/2016 |
| KR | 10-2017-0039922 A | 4/2017 |
| KR | 10-2017-0045181 A | 4/2017 |

(56) References Cited

FOREIGN PATENT DOCUMENTS

| | | |
|---|---|---|
| KR | 10-2018-0001799 A | 1/2018 |
| KR | 10-2018-0035750 A | 4/2018 |
| KR | 10-1907912 B1 | 10/2018 |
| KR | 10-1907916 B1 | 10/2018 |
| KR | 10-1923466 B1 | 11/2018 |
| KR | 10-2101006 B1 | 4/2020 |
| KR | 10-2124946 B1 | 6/2020 |
| KR | 10-2020-0131751 A | 11/2020 |
| KR | 10-2021-0057253 A | 5/2021 |
| RU | 2744449 C1 | 3/2021 |
| TW | 521539 B | 2/2003 |
| TW | M303584 U | 12/2006 |
| TW | 200737342 A | 10/2007 |
| TW | 200823313 A | 6/2008 |
| TW | I329143 B | 8/2010 |
| TW | 201112481 A | 4/2011 |
| TW | 201225389 A | 6/2012 |
| TW | 201310758 A | 3/2013 |
| TW | 201411922 A | 3/2014 |
| TW | I593484 B | 8/2017 |
| TW | 202002723 A | 1/2020 |
| TW | 202033297 A | 9/2020 |
| WO | 03/77333 A1 | 9/2003 |
| WO | 2004/054017 A1 | 6/2004 |
| WO | 2004/089821 A1 | 10/2004 |
| WO | 2005/039752 A1 | 5/2005 |
| WO | 2006/100837 A1 | 9/2006 |
| WO | 2010/095726 A1 | 8/2010 |
| WO | 2011/082596 A1 | 7/2011 |
| WO | 2011/090779 A2 | 7/2011 |
| WO | 2012/023858 A1 | 2/2012 |
| WO | 2012/114108 A1 | 8/2012 |
| WO | 2012/144424 A1 | 10/2012 |
| WO | 2012/162743 A1 | 12/2012 |
| WO | 2013/017217 A1 | 2/2013 |
| WO | 2014/011239 A2 | 1/2014 |
| WO | 2014/110604 A2 | 7/2014 |
| WO | 2014/153318 A1 | 9/2014 |
| WO | 2015/064633 A1 | 5/2015 |
| WO | 2015/174949 A1 | 11/2015 |
| WO | 2015/187389 A2 | 12/2015 |
| WO | 2016/048862 A1 | 3/2016 |
| WO | 2016/082120 A1 | 6/2016 |
| WO | 2016/091957 A1 | 6/2016 |
| WO | 2017/074081 A1 | 5/2017 |
| WO | 2017/074084 A1 | 5/2017 |
| WO | 2017/080978 A1 | 5/2017 |
| WO | 2017/091543 A1 | 6/2017 |
| WO | 2017/106601 A8 | 7/2017 |
| WO | 2017/118955 A1 | 7/2017 |
| WO | 2017/130946 A1 | 8/2017 |
| WO | 2017/158349 A1 | 9/2017 |
| WO | 2017/177315 A1 | 10/2017 |
| WO | 2017/178841 A1 | 10/2017 |
| WO | 2017/223482 A1 | 12/2017 |
| WO | 2018/133429 A1 | 7/2018 |
| WO | 2018/141082 A1 | 8/2018 |
| WO | 2018/145750 A1 | 8/2018 |
| WO | 2019/045923 A1 | 3/2019 |
| WO | 2019/052670 A1 | 3/2019 |
| WO | 2019/095039 A1 | 5/2019 |
| WO | 2019/124344 A1 | 6/2019 |
| WO | 2019/139773 A1 | 7/2019 |
| WO | 2019/178668 A1 | 9/2019 |
| WO | 2019/243870 A1 | 12/2019 |
| WO | 2019/246242 A1 | 12/2019 |
| WO | 2019/246257 A1 | 12/2019 |
| WO | 2020/009955 A1 | 1/2020 |
| WO | 2020/013667 A1 | 1/2020 |
| WO | 2020/041767 A1 | 2/2020 |
| WO | 2020/041775 A1 | 2/2020 |
| WO | 2020/091854 A1 | 5/2020 |
| WO | 2020/132343 A1 | 6/2020 |
| WO | 2020/223358 A1 | 11/2020 |
| WO | 2020/223374 A1 | 11/2020 |
| WO | 2021/029769 A1 | 2/2021 |
| WO | 2021/046249 A1 | 3/2021 |
| WO | 2021/085670 A1 | 5/2021 |
| WO | 2021/115596 A1 | 6/2021 |
| WO | 2021/118762 A1 | 6/2021 |
| WO | 2021/127132 A1 | 6/2021 |
| WO | 2021/159117 A1 | 8/2021 |
| WO | 2021/191281 A1 | 9/2021 |
| WO | 2021/245410 A1 | 12/2021 |
| WO | 2021/245411 A1 | 12/2021 |
| WO | 2021/263273 A1 | 12/2021 |
| WO | 2022/005999 A1 | 1/2022 |
| WO | 2022/032301 A1 | 2/2022 |
| WO | 2022/043701 A1 | 3/2022 |
| WO | 2022/043702 A1 | 3/2022 |
| WO | 2022/043704 A1 | 3/2022 |
| WO | 2022/043705 A1 | 3/2022 |
| WO | 2022/067303 A1 | 3/2022 |
| WO | 2022/075846 A1 | 4/2022 |
| WO | 2022/107907 A1 | 5/2022 |
| WO | 2022/133585 A1 | 6/2022 |
| WO | 2022/136699 A1 | 6/2022 |
| WO | 2022/150828 A1 | 7/2022 |
| WO | 2023/022492 A1 | 2/2023 |
| WO | 2024/013488 A1 | 1/2024 |

OTHER PUBLICATIONS

Wang, Y. et al., "Developments in Nanostructured Cathode Materials for High-Performance Lithium-Ion Batteries", Advanced Materials, Jun. 2008, pp. 2251-2269.

Yang et al., "Preparation of Spherical Titanium Powders from Polygonal Titanium Hydride Powders by Radio Frequency Plasma Treatment" Materials Transactions, vol. 54, No. 12 (2013) pp. 2313-2316.

Zavilopulo, A. N., et al., "Ionization and Dissociative Ionization of Methane Molecules", Technical Physics, vol. 58, No. 9, 2013, pp. 1251-1257.

Zeng, X., et al., "Growth and morphology of carbon nanostructures by microwave-assisted pyrolysis of methane", Physica E., vol. 42, No. 8, 2010, pp. 2103-2108.

Zhang , K., Ph.D., "The Microstructure and Properties of Hipped Powder Ti Alloys", a thesis submitted to The University of Birmingham, College of Engineering and Physical Sciences, Apr. 2009, in 65 pages.

Zhang et al., Microstructures and properties of high-entropy alloys, Progress in Materials Science, vol. 61, 2013, pp. 1-93.

Zhang, H., et al., "Plasma activation of methane for hydrogen production in a N2 rotating gliding arc warm plasma: A chemical kinetics study", Chemical Engineering Journal, vol. 345, 2018, pp. 67-78.

Zhang, J., et al., "Flexible and ion-conducting membrane electrolytes for solid-state lithium batteries: Dispersion of garnet nanoparticles in insulating polyethylene oxide", Nano Energy, vol. 28, 2016, pp. 447-454.

Zhang, X. et al., "High thickness tungsten coating with low oxygen content prepared by air plasma spray", Cailiao Gongcheng. (2014) (5) pp. 23-28 (Year: 2014).

Zhang, Y. D. et al., "High-energy cathode materials for Li-ion batteries: A review of recent developments", Science China Technological Sciences, Sep. 2015, vol. 58(11), pp. 1809-1828.

Zhang, Y. S. et al., "Core-shell structured titanium-nitrogen alloys with high strength, high thermal stability and good plasticity", Scientific Reports, Jan. 2017, vol. 7, in 8 pages.

Zhao Jing et al., Introduction to Materials Science, China Light Industry Press, Jun. 2013, 2nd edition, 1st printing, p. 61.

Zhong, R., et al., "Continuous preparation and formation mechanism of few-layer graphene by gliding arc plasma", Chemical Engineering Journal, vol. 387, 2020, 10 pages.

Zielinski, A et al., "Modeling and Analysis of a Dual-Channel Plasma Torch in Pulsed Mode Operation For Industrial Space, and Launch Applications", IEEE Transactions on Plasma Science, Jul. 2015, vol. 43(7), pp. 2201-2206.

(56) References Cited

OTHER PUBLICATIONS

"Build Boldly", Technology Demonstration, 6K Additive, [publication date unknown], in 11 pages.
"High-entropy alloy", Wikipedia, webpage last edited Dec. 29, 2022 (accessed Jan. 17, 2023), in 16 pages. URL: https://en.wikipedia.org/wiki/High-entropy_alloy.
6K, "6K Launches World's First Premium Metal Powders For Additive Manufacturing Derived From Sustainable Sources", Cision PR Newswire, Nov. 4, 2019, in 1 page. URL: https://www.prnewswire.com/news-releases/6k-launches-worlds-first-premium-metal-powders-for-additive-manufacturing-derived-from-sustainable-sources-300950791.html.
Ajayi, B. et al., "A rapid and scalable method for making mixed metal oxide alloys for enabling accelerated materials discovery", Journal of Materials Research, Jun. 2016, vol. 31, No. 11, pp. 1596-1607.
Ajayi, B. P. et al., "Atmospheric plasma spray pyrolysis of lithiated nickel-manganese-cobalt oxides for cathodes in lithium-ion batteries", Chemical Engineering Science, vol. 174, Sep. 14, 2017, pp. 302-310.
Ali, M. et al., Spray Flame Synthesis (SFS) of Lithium Lanthanum Zirconate (LLZO) Solid Electrolyte, Materials, vol. 14, No. 13, 2021, pp. 1-13.
Barbis et al., "Titanium powders from the hydride-dehydride process." Titanium Powder Metallurgy. Butterworth-Heinemann, 2015. pp. 101-116.
Bardos, L., et al., "Differences between microwave and RF activation of nitrogen for the PECVD process", J. Phys. D: Appl. Phys., vol. 15, 1982, pp. 79-82.
Bardos, L., et al., "Microwave Plasma Sources and Methods in Processing Technology", IEEE Press, 2022, 10 pages.
Bobzin, K. et al., "Modelling and Diagnostics of Multiple Cathodes Plasma Torch System for Plasma Spraying", Frontiers of Mechanical Engineering, Sep. 2011, vol. 6, pp. 324-331.
Bobzin, K. et al., "Numerical and Experimental Determination of Plasma Temperature during Air Plasma Spraying with a Multiple Cathodes Torch", Journal of Materials Processing Technology, Oct. 2011, vol. 211, pp. 1620-1628.
Boulos, M. I., "The inductively coupled radio frequency plasma." Journal of High Temperature Material Process, Jan. 1997, vol. 1, pp. 17-39.
Boulos, M., "Induction Plasma Processing of Materials for Powders, Coatings, and Near-Net-Shape Parts", Advanced Materials & Processes, Aug. 2011, pp. 52-53, in 3 pages.
Boulos, M., "Plasma power can make better powders", Metal Powder Report, May 2004, vol. 59(5), pp. 16-21.
Carreon, H. et al., "Study of Aging Effects in a Ti—6AL—4V alloy with Widmanslallen and Equiaxed Microstructures by Non-destructive Means", AIP Conference Proceedings 1581, 2014 (published online Feb. 17, 2015), pp. 739-745.
Chang, S. et al., "One-Step Fast Synthesis of Li4Ti5O12 Particles Using an Atmospheric Pressure Plasma Jet", Journal of the American Ceramic Society, Dec. 26, 2013, vol. 97, No. 3, pp. 708-712.
Chau, J. L. K. et al. "Microwave Plasma Production of Metal Nanopowders," Jun. 12, 2014, Inorganics, vol. 2, pp. 278-290 (Year: 2014).
Chen, G. et al., "Spherical Ti-6AI-4V Powders Produced by Gas Atomization", Key Engineering Materials, vol. 704, Aug. 2016, pp. 287-292. URL: https://www.scientific.net/KEM.704.287.
Chen, Z., et al., "Advanced cathode materials for lithium-ion batteries", MRS Bulletin, vol. 36, No. 7, 2011, pp. 498-505.
Chikumba et al., "High Entropy Alloys: Development and Applications" 7th International Conference on Latest Trends in Engineering & Technology (ICLTET'2015) Nov. 26-27, 2015 Irene, Pretoria (South Africa).
Choi, S. I., et al., "Continuous process of carbon nanotubes synthesis by decomposition of methane using an arc-jet plasma", Thin Solid Films, 2006, vol. 506-507, 2006, pp. 244-249.

Coldwell, D. M. et al., "The reduction of $SiO_2$ with Carbon in a Plasma", Journal of Electrochemical Society, Jan. 1977, vol. 124, pp. 1686-1689.
Collin, J. E., et al., "Ionization of methane and it's electronic energy levels", Canadian Journal of Chemistry, 2011, vol. 45, No. 16, pp. 1875-1882.
Dearmiti, C., "26. Functional Fillers for Plastics", in Applied Plastics Engineering Handbook—Processing and Materials, ed., Myer Kuiz, Elsevier, 2011, pp. 455-468.
Decker, J., et al., "Sample preparation protocols for realization of reproducible characterization of single-wall carbon nanotubes", Metrologia, 2009, vol. 46, No. 6, pp. 682-692.
Ding, F., et al., "Nucleation and Growth of Single-Walled Carbon Nanotubes: A Molecular Dynamics Study", J. Phys. Chem. B, vol. 108, 2004, pp. 17369-17377.
Ding, F., et al., "The Importance of Strong Carbon-Metal Adhesion for Catalytic Nucleation of Single-Walled Carbon Nanotubes", Nano Letters, 2008, vol. 8, No. 2, pp. 463-468.
Dolbec, R., "Recycling Spherical Powders", Presented at Titanium 2015, Orlando, FL, Oct. 2015, in 20 pages.
Dors, M., et al., "Chemical Kinetics of Methane Pyrolysis in Microwave Plasma at Atmospheric Pressure", Plasma Chem Plasma Process, 2013, vol. 34, No. 2, pp. 313-326.
Eremin, A., et al., "The Role of Methyl Radical in Soot Formation"; Combustion Science and Technology, vol. 191, No. 12, 2008, pp. 2226-2242.
Finckle, J. R., et al., "Plasma Pyrolysis of Methane to Hydrogen and Carbon Black", Industrial Engineering and Chemical Research, 2002. vol. 41, No. 6, 2002, pp. 1425-1435.
Fu, D., et al., "Direct synthesis of Y-junction carbon nanotubes by microwave-assisted pyrolysis of methane", Materials Chemistry and Physics, vol. 118, vol. 2-3, 2009, pp. 501-505.
Fuchs, G.E. et al., "Microstructural evaluation of as-solidified and heat-treated $\gamma$-TiAl based powders", Materials Science and Engineering, 1992, A152, pp. 277-282.
Gleiman, S. et al., "Melting and spheroidization of hexagonal boron nitride in a microwave-powered, atmospheric pressure nitrogen plasma", Journal of Materials Science, Aug. 2002, vol. 37(16), pp. 3429-3440.
Grace, J. et al., "Connecting particle sphericity and circularity", Particuology, vol. 54, 2021, pp. 1-4, ISSN 1674-2001, https://doi.org/10.1016/j.partic.2020.09.006. (Year: 2020).
Gradl, P. et al., "GRCop-42 Development and Hot-fire Testing Using Additive Manufacturing Powder Bed Fusion for Channel-Cooled Combustion Chambers", 55th AIAA/SAE/ASEE Joint Propulsion Conference 2019, Aug. 2019, pp. 1-26.
Haghighatpanah, S., et al., "Computational studies of catalyst-free single walled carbon nanotube growth", J Chem Phys, vol. 139, No. 5, 10 pages.
Haneklaus, N., et al., "Stop Smoking—Tube-In-Tube Helical System for Flameless Calcination of Minerals", Processes, vol. 5, No. 4, 2017, pp. 1-12.
He et al., "A precipitation-hardened high-entropy alloy with outstanding tensile properties" Acta Materialia 102, Jan. 2016, pp. 187-196.
Houmes et al., "Microwave Synthesis of Ternary Nitride Materials", Journal of Solid State Chemistry, vol. 130, Issue 2, May 1997, pp. 266-271.
Huo, H., et al., "Composite electrolytes of polyethylene oxides/garnets interfacially wetted by ionic liquid for room-temperature solid-state lithium battery", Journal of Power Sources, vol. 372, 2017, pp. 1-7.
International Preliminary Report on Patentability and Written Opinion, re PCT Application No. PCT/US2021/070749, mailed Jan. 5, 2023.
International Search Report and Written Opinion, re PCT Application No. PCT/US2021/070749, mailed Sep. 29, 2021.
Irle, S., et al., "Milestones in molecular dynamics simulations of single-walled carbon nanotube formation: A brief critical review", Nano Research, 2009, vol. 2, No. 10, 14 pages.
Ivasishin, et al., "Innovative Process for Manufacturing Hydrogenated Titanium Powder for Solid State Production of R/M Titanium Alloy Components" Titanium 2010, Oct. 3-6, 2010, 27 pages.

(56) References Cited

OTHER PUBLICATIONS

Jasek, O., et al., "Microwave plasma-based high temperature dehydrogenation of hydrocarbons and alcohols as a single route to highly efficient gas phase synthesis of freestanding graphene", Nanotechnology, 2021, vol. 32, 11 pages.

Jasinski, M., et al., "Atmospheric pressure microwave plasma source for hydrogen production", International Journal of Hydrogen Energy, vol. 38, Issue 26, 2013, pp. 11473-11483.

Jasinski, M., et al., "Hydrogen production via methane reforming using various microwave plasma sources", Chem. Listy, 2008, vol. 102, pp. s1332-s1337.

Jia, H. et al., "Hierarchical porous silicon structures with extraordinary mechanical strength as high-performance lithium-ion battery anodes", Nature Communications, Mar. 2020, vol. 11, in 9 pages. URL: https://doi.ora/10.1038/s41467-020-15217-9.

Kassel, L. S., "The Thermal Decomposition of Methane", Journal of the American Chemical Society, vol. 54, No. 10, 1932, pp. 3949-3961.

Kerscher, F., et al., "Low-carbon hydrogen production via electron beam plasma methane pyrolysis: Techno-economic analysis and carbon footprint assessment", International Journal of Hydrogen Energy, vol. 46, Issue 38, 2021, pp. 19897-19912.

Kim, H., et al., "Three-Dimensional Porous Silicon Particles for Use in High-Performance Lithium Batteries", Angewandte Chemie International Edition, vol. 47, No. 2, Dec. 15, 2008, pp. 10151-10154.

Kim, K. S., et al., "Synthesis of single-walled carbon nanotubes by induction thermal plasma", Nano Research, 2009, vol. 2, No. 10, pp. 800-817.

Kim, S. et al., "Thermodynamic Evaluation of Oxygen Behavior in Ti Powder Deoxidized by Ca Reductant", Met. Mater. Int., 2016, vol. 22, pp. 658-662.

Ko, M. et al., "Challenges in Accommodating vol. Change of Si Anodes for Li-Ion Batteries", Chem Electro Chem, Aug. 2015, vol. 2, pp. 1645-1651. URL: https://doi.org/10.1002/celc.201500254.

Kotlyarov, V. I. et al, "Production of Spherical Powders on the Basis of Group IV Metals for Additive Manufacturing", Inorganic Materials: Applied Research, Pleiades Publishing, May 2017, vol. 8, No. 3, pp. 452-458.

Kumal, R. R., et al., "Microwave Plasma Formation of Nanographene and Graphitic Carbon Black", C—Journal of Carbon Research, 2020, vol. 6, No. 4, 10 pages.

Laine, R. M. et al., "Making nanosized oxide powders from precursors by flame spray pyrolysis", Key Engineering Materials, Jan. 1999, vol. 159-160, pp. 17-24.

Lee, D. H., et al., "Comparative Study of Methane Activation Process by Different Plasma Sources", Plasma Chem. Plasma Process., vol. 33, No. 4, 2013, pp. 647-661.

Lee, D. H., et al., "Mapping Plasma Chemistry in Hydrocarbon Fuel Processing Processes", Plasma Chem. Plasma Process., vol. 33, No. 1, 2013, pp. 249-269.

Li, L. et al., "Spheroidization of silica powders by radio frequency inductively coupled plasma with Ar—H2 and Ar—N2 as the sheath gases at atmospheric pressure", International Journal of Minerals, Metallurgy, and Materials, Sep. 2017, vol. 24(9), pp. 1067-1074.

Li, X. et al., "Mesoporous silicon sponge as an anti-pulverization structure for high-performance lithium-ion battery anodes", Nature Communications, Jul. 2014, vol. 5, Article No. 4105, in 7 pages. URL: httDs://doi.org/10.1038/ncomms5105.

Li, Z. et al., "Strong and Ductile Non-Equicaloric High-Entropy Alloys: Design, Processing, Microstructure, and Mechanical Properties", The Journal of the Minerals, Metals & Materials Society, Aug. 2017, vol. 69(1), pp. 2099-2106. URL: https://doi.org/10.1007/s11837-017-2540-2.

Lin et al., "A low temperature molten salt process for aluminothermic reduction of silicon oxides to crystalline Si for Li-ion batteries", Energy Environ. Sci., 2015, 8, 3187 (Year: 2015).

Lin, M., "Gas Quenching with Air Products' Rapid Gas Quenching Gas Mixture", Air Products, Dec. 31, 2007, in 4 pages. URL: hllps://www.airproducts.co.uk/-/media/airproducts/liles/en/330/330-07-085-us-gas-quenching-wilh-air-products-rapid-Jas-quenching-gas-mixture.pdf.

Liu, Y., et al., "Advances of microwave plasma-enhanced chemical vapor deposition in fabrication of carbon nanotubes: a review", J Mater Sci., vol. 55, 2021, pp. 12559-12583.

Liu, Z., et al., "Synthesis and characterization of LiNi1-x-yCoxMnyO2 as the cathode materials of secondary lithium batteries", Journal of Power Sources, vol. 81-82, Sep. 1999, pp. 416-419.

Majewksi, T., "Investigation of W—Re—Ni heavy alloys produced from plasma spheroidized powders", Solid State Phenomena, Mar. 2013, vol. 199, pp. 448-453.

Miller et al., "The reduction of silica with carbon and silicon carbide", Journal of the American Ceramic Society, 1978, 62 (Year: 1978).

Moisan, M. et al., "Waveguide-Based Single and Multiple Nozzle Plasma Torches: the Tiago Concept", Plasma Sources Science and Technology, Jun. 2001, vol. 10, pp. 387-394.

Moldover, M. R. et al., "Measurement of the Universal Gas Constant R Using a Spherical Acoustic Resonator", Physical Review Letters, Jan. 1988, vol. 60(4), pp. 249-252.

Muoio, C. et al., "Phase Homogeneity in Y2O3—MgO Nanocomposites Synthesized by Thermal Decomposition of Nitrate Precursors with Ammonium Acetate Additions" J. Am. Ceram. Soc., 94[12] 4207-4217, 2011.

Murugan et al. "Nanostructured a/β-tungsten by reduction of WO3 under microwave plasma", Int. Journal of Refractory Metals and Hard Materials 29 (2011) 128-133. (Year: 2011).

Nichols, F. A., "On the spheroidization of rod-shaped particles of finite length", Journal of Materials Science, Jun. 1976, vol. 11, pp. 1077-1082.

Nyutu, E. et al., "Ultrasonic Nozzle Spray in Situ Mixing and Microwave-Assisted Preparation of Nanocrystalline Spinel Metal Oxides: Nickel Ferrite and Zinc Aluminate", Journal of Physical Chemistry C, Feb. 1, 2008, vol. 112, No. 5, pp. 1407-1414.

Ohta, R. et al., "Effect of PS-PVD production throughput on Si nanoparticles for negative electrode of lithium ion batteries", Journal of Physics D: Applied Physics, Feb. 2018, vol. 51(1), in 7 pages.

Olsvik, O., et al., "Thermal Coupling of Methane—A Comparison Between Kinetic Model Data and Experimental Data", Thermochimica Acta., vol. 232, No. 1, 1994, pp. 155-169.

Or, T. et al., "Recycling of mixed cathode lithium-ion batteries for electric vehicles: Current status and future outlook", Carbon Energy, Jan. 2020, vol. 2, pp. 6-43. URL: https://doi.org/10.1002/cey2.29.

Park et al. "Preparation of spherical WTaMoNbV refractory high entropy alloy powder by inductively-coupled thermal plasma", Materials Letters 255 (2019) 126513 (Year: 2019).

Popescu et al.. "New TiZrNbTaFe high entropy alloy used for medical applications" IOP Conference Series: Materials Science and Engineering 400. Mod Tech 2018 (2018), 9 pages.

Pulsation Reactors—Thermal Processing for Extraordinary Material Properties, retrieved from https://www.ibu-tec.com/facilities/pulsation-reactors/, retrieved on Mar. 18, 2023, pp. 5.

Reig, L. et al., "Microstructure and Mechanical Behavior of Porous Ti—6Al—4V Processed by Spherical Powder Sintering", Materials, Oct. 23, 2013, vol. 6, pp. 4868-4878.

Sabat, K.C., "Hydrogen Plasma—Thermodynamics", Journal of Physics: Conference Series, 2019, International Conference on Applied Physics, Powder and Material Science, in 6 pages.

Sastry, S.M.L. et al., "Rapid Solidification Processing of Titanium Alloys", Journal of Metals (JOM), Sep. 1983, vol. 35, pp. 21-28.

Savage, S. J. et al., "Production of rapidly solidified metals and alloys", Journal of Metals (JOM), Apr. 1984, vol. 36, pp. 20-33.

Schmidt-Ott, K., "Plasma-Reduction: Its Potential for Use in the Conservation of Metals", Proceedings of Metal 2004, Oct. 2004, pp. 235-246.

Seehra, M. S., et al., "Correlation between X-ray diffraction and Raman spectra of 16 commercial graphene-based materials and their resulting classification", Carbon N Y., 2017, vol. 111, pp. 380-384.

Sheng, Y. et al., "Preparation of Micro-spherical Titanium Powder by RF Plasma", Rare Metal Materials and Engineering, Jun. 2013, vol. 42, No. 6, pp. 1291-1294.

(56) References Cited

OTHER PUBLICATIONS

Sheng, Y. et al., "Preparation of Spherical Tungsten Powder by RF Induction Plasma", Rare Metal Materials and Engineering, Nov. 2011, vol. 40, No. 11, pp. 2033-2037.
SK makes world's 1st NCM battery with 90% nickel, The Investor, available online <https://www.theinvestor.co.kr/view.php?ud=20200810000820>, dated Aug. 10, 2020, 2 pages.
Suryanarayana, C. et al., "Rapid solidification processing of titanium alloys", International Materials Reviews, 1991, vol. 36, pp. 85-123.
Suryanarayana, C., "Recent Developments in Mechanical Alloying", Reviews on Advanced Materials Science, Aug. 2008, vol. 18(3), pp. 203-211.
Tang, H. P. et al., "Effect of Powder Reuse Times on Additive Manufacturing of Ti--6Al--4V by Selective Electron Beam Melting", JOM, Mar. 2015, vol. 67, pp. 555-563.
Taylor, G., et al.; "Reduction of Metal Oxides by Hydrogen", 1930, vol. 52 (Year: 1930).
Thierry, "Hydrogen (H2) Plasma", Thierry Corp., retrieved from internet on Feb. 15, 2024, in 2 pages. URL: https://www.thierry-corp.com/plasma-knowledgebase/hydrogen-h2-plasma.
Van Laar, J. H. et al., "Spheroidization of Iron Powder in a Microwave Plasma Reactor", Journal of the Southern African Institute of Mining and Metallurgy, Oct. 2016, vol. 116, No. 10, pp. 941-946.
Veith, M. et al., "Low temperature synthesis of nanocrystalline Y3Al5O12 (YAG) and Ce-doped Y3Al5O12 via different sol-gel methods", J. Maler Chem, 1999, pp. 3069-3079.
Walter et al., "Microstructural and mechanical characterization of sol gel-derived Si—O—C glasses" Journal of the European Ceramic Society, vol. 22, Issue 13, Dec. 2002, pp. 2389-2400.
Wang, H., et al., "A detailed kinetic modeling study of aromatics formation in laminar premixed acetylene and ethylene flames" Combustion and Flame, vol. 110, No. 1-2, 1997, pp. 173-221.
Wang, J. et al., "Preparation of Spherical Tungsten and Titanium Powders by RF Induction Plasma Processing", Rare Metals, Jun. 2015 (published online May 31, 2014), vol. 34, No. 6, pp. 431-435.

* cited by examiner

MICROCOMPOSITE ALLOY STRUCTURE

REFERENCE TO RELATED APPLICATIONS

This application is a continuation of U.S. application Ser. No. 17/304,727, filed Jun. 24, 2021, which claims the priority benefit under 35 U.S.C. § 119(e) of U.S. Provisional Application No. 63/043,958, filed Jun. 25, 2020, the entire disclosure of which is incorporated herein by reference.

BACKGROUND

Field

The present disclosure is generally directed in some embodiments towards powders, structures, precursors, and methods of manufacturing said powders and structures to form strain tolerant materials.

Description of the Related Art

Alloy-type anode materials, which include Si, Si alloys, SiO, and Sn alloys, have been an area of intense research for over 20 years. An advantage to this class of materials is a large increase in lithium (Li) storage capacity, or simply capacity, over conventional anode materials based on carbon (primarily graphite), as much as 10× in the case of Si compared to typical commercial graphite anodes. However, their adoption as a full replacement for graphite has been impeded by very poor cycle life. Silicon (Si) undergoes a 300% volume increase upon full lithiation, and 300% decrease upon subsequent delithiation. This massive volume cycling results in mechanical damage to the Si particles, which results in material disconnection, fresh surfaces that react with the electrolyte and consume lithium while passivating, and thus capacity loss and impedance growth, in as few as a few cycles in the worst case. As a result, alloy anodes have been limited commercially to blends of very fine alloy particles with graphite, generally at <10% of the total active material.

SUMMARY

Disclosed herein are embodiments of a strain tolerant particle comprising a composite structure including an energy storage structure (or phase) comprising at least one element, wherein the energy storage structure is configured to store ions, and a reinforcing structure (or phase) comprising one or more elements that phase separate from the energy storage phase. This phase separation can be via a eutectic or eutectoid reaction, wherein the reinforcing structure provides mechanical support to the energy storage structure.

In some embodiments, the energy storage structure comprises silicon and/or tin. In some embodiments, the reinforcing structure comprises nickel, copper, iron, aluminum, magnesium, manganese, cobalt, molybdenum, zirconium, vanadium, titanium, chromium, bismuth, antimony, germanium, boron, phosphorus, carbon, sulfur, nitrogen, and/or oxygen. In some embodiments, the energy storage structure comprises silicon and the reinforcing structure comprises an intermetallic compound including nickel and silicon. In some embodiments, the intermetallic compound comprises $NiSi_2$ and $NiSi$. In some embodiments, the reinforcing structure comprises a higher nickel content than the nickel content of the energy storage structure.

In some embodiments, the composite structure comprises a silicon mole fraction greater than or equal to about 0.56. In some embodiments, the composite structure comprises a silicon mole fraction greater than or equal to about 0.7.

In some embodiments, the energy storage structure comprises silicon and the reinforcing structure comprises an intermetallic compound including copper and silicon. In some embodiments, the intermetallic compound comprises $Cu_{19}Si_6$. In some embodiments, the reinforcing structure comprises a higher copper content than the copper content of the energy storage structure.

In some embodiments, the composite structure comprises a plurality of energy storage structures and a plurality of reinforcing structures which bind the plurality of energy storage structures.

In some embodiments, the composite structure comprises a silicon mole fraction greater than or equal to about 0.24. In some embodiments, the composite structure comprises a silicon mole fraction greater than or equal to about 0.32.

Also disclosed herein are embodiments of a method of manufacturing a strain tolerant particle comprising preparing a feedstock comprising finely divided droplets or particles with a certain ratio of constituent elements that phase separate into two or more phases by eutectic or eutectoid reaction, introducing the feedstock into a plasma or plasma exhaust of a microwave plasma torch to melt the feedstock, and cooling the feedstock in a rapid but controlled manner so as to trigger a eutectic or eutectoid transition resulting in one or more phase separations which create a composite structure comprising an energy storage structure and a reinforcing structure that provides mechanical support to the energy storage structure.

In some embodiments, the feedstock comprises silicon and at least one of copper, nickel, or iron. In some embodiments, the feedstock comprises copper and comprises a silicon mole fraction greater than or equal to about 0.24. In some embodiments, the feedstock comprises copper and comprises a silicon mole fraction greater than or equal to about 0.32. In some embodiments, the feedstock comprises nickel and comprises a silicon mole fraction greater than or equal to about 0.56. In some embodiments, the feedstock comprises nickel and comprises a silicon mole fraction greater than or equal to about 0.7.

Also disclosed herein are embodiments of an anode of a lithium ion battery comprising a plurality of strain tolerant particles comprising an in-situ formed composite structure comprising a plurality of energy storage structures and reinforcing structures, wherein the energy storage phase comprises substantially silicon, and wherein the reinforcing structure comprises an element or elements that phase separate into two or more phases with silicon by eutectic or eutectoid reaction.

In some embodiments, the element comprises at least one of nickel, copper, or iron.

Also disclosed herein are embodiments of a strain tolerant particle comprising a composite structure including an energy storage phase comprising at least one element, wherein the energy storage phase is configured to store ions and a reinforcing phase comprising one or more elements, where upon cooling from the melt a eutectic or eutectoid transition occurs resulting in phase separation into two or more distinct phases, at least 1 of which is an energy storage phase, and at least one of which is a reinforcing phase, resulting in an in-situ grown composite microstructure at the particle level, wherein the reinforcing phase or phases provide mechanical support to the energy storage phase or phases.

Further embodiments are directed to a particle as disclosed herein.

Further embodiments are directed to a powder as disclosed herein.

Further embodiments are directed to a method of manufacturing a particle as disclosed herein.

DETAILED DESCRIPTION

Disclosed herein are embodiments of methods, powders/particles, structures, feedstocks, and precursors for forming strain tolerant materials, and devices which incorporate said materials. The materials can be powders of a specific particle level composite structure for a strain-tolerant alloy-type anode. The strain-tolerant alloy-type anode can include strain tolerant particles, which can include a structure capable of withstanding the strain created from energy storage and thus prevent the particles from breaking up.

In some embodiments, the particle level composite structure can include both an energy storage structure (e.g. phase, chemistry, formulation, configuration, framework) and a reinforcing structure (e.g. phase, chemistry, formulation, configuration, framework). In some embodiments, the particle may include alternating regions of the energy storage structure and the reinforcing structure. The reinforcing phase may have some energy storage capacity.

The feature size of the composite structures may be on the order of micron scale to nano-scale. As disclosed herein, the powders can be formed by processing certain feedstock materials in a microwave plasma torch, or other processing method. The processing can include feeding the feedstock into a microwave plasma torch, a plasma plume of the microwave plasma torch, and/or an exhaust of the microwave plasma torch. The location may vary depending on the type of feedstock used. Further the feedstock can be produced or selected based on different requirements. Examples of requirements are aspect ratio, particle size distribution (PSD), chemistry, density, diameter, sphericity, oxygenation, and pore size. The processing can further include cooling the processed feedstock through a controlled cooling rate. It has been discovered that a higher cooling rate results in finer structures.

Figure 1A:
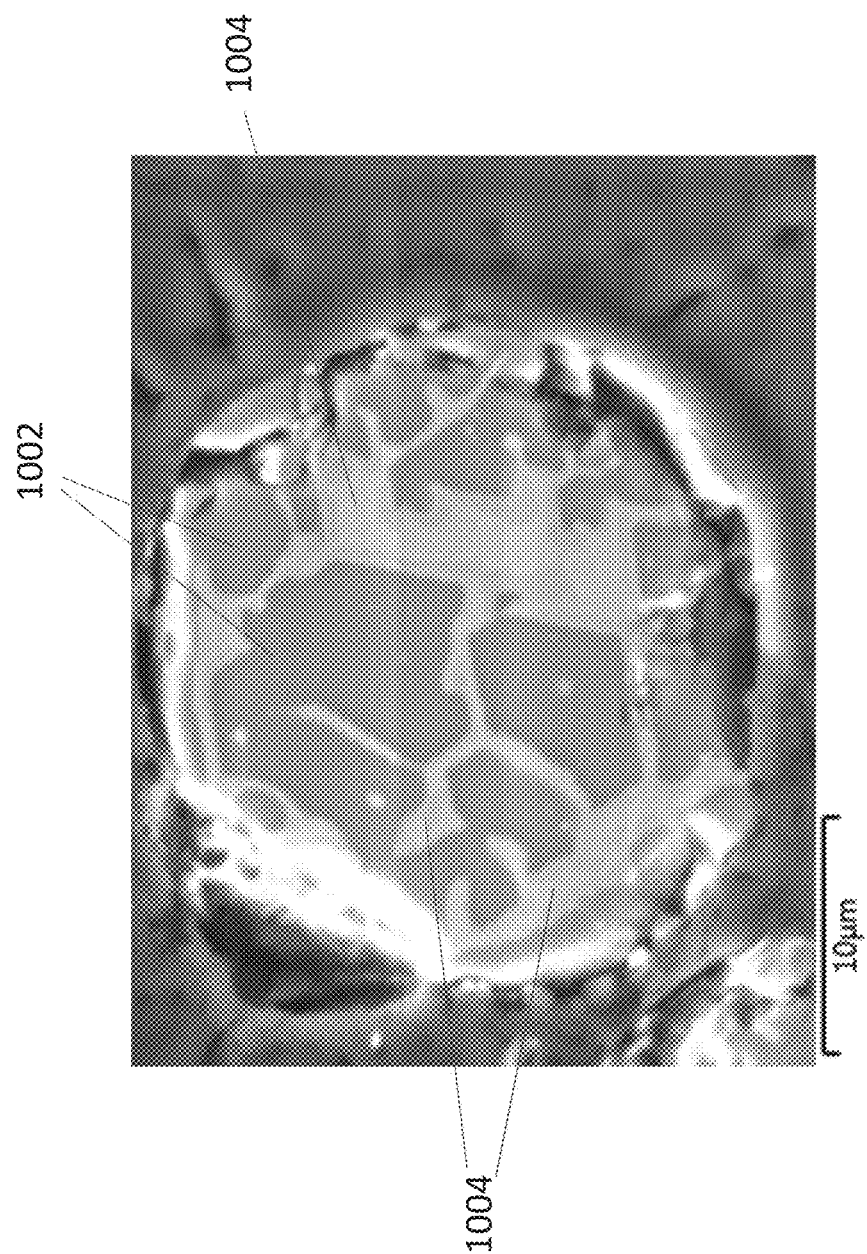
FIG. 1A is a scanning electron microscopy (SEM) image of an exemplary strain tolerant particle according to the present disclosure.
Figure 1B:
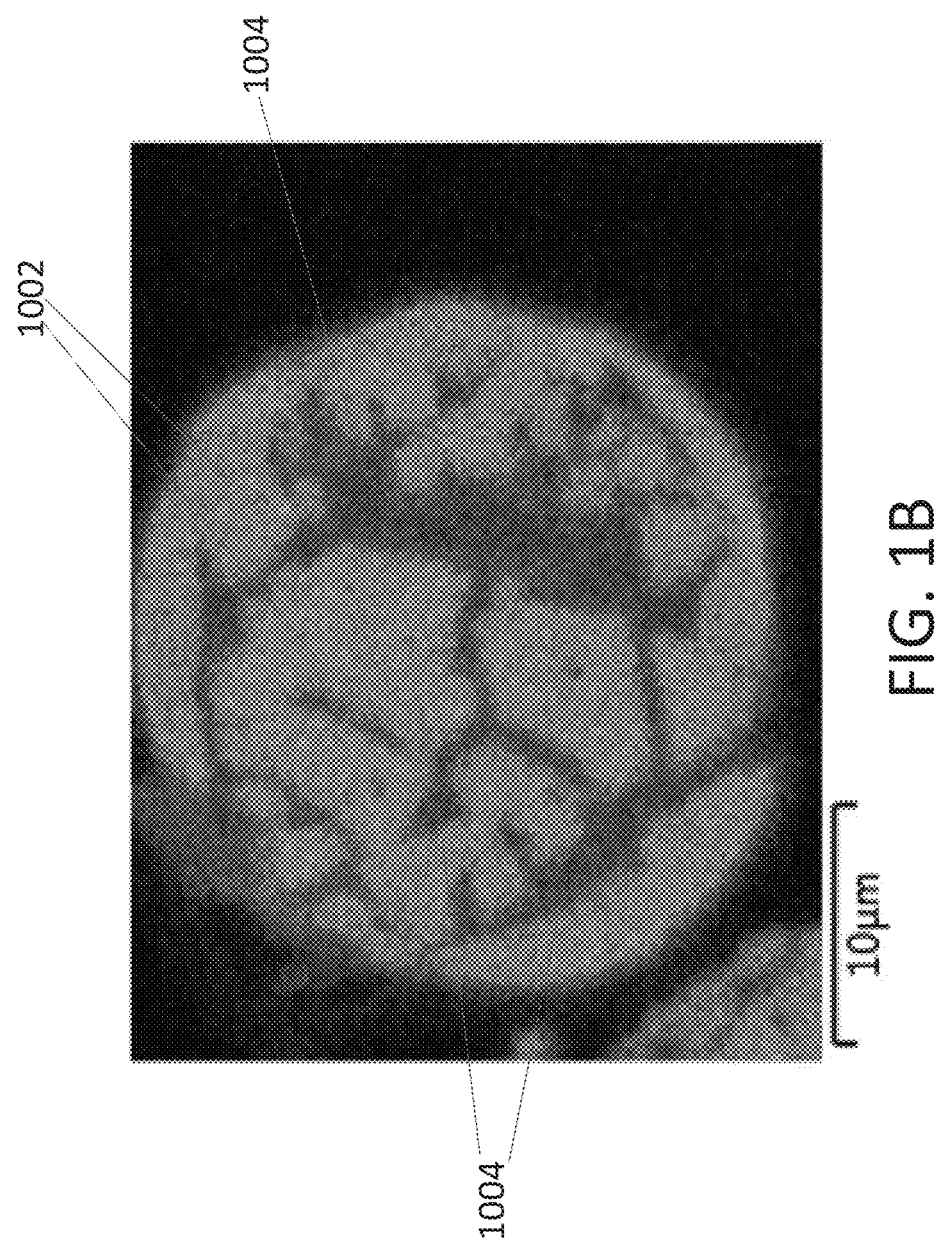
FIG. 1B is an energy-dispersive X-ray Spectroscopy (EDS) element composition map showing regions of high concentrations of silicon (Si) of the particle of FIG. 1A.
Figure 1C:
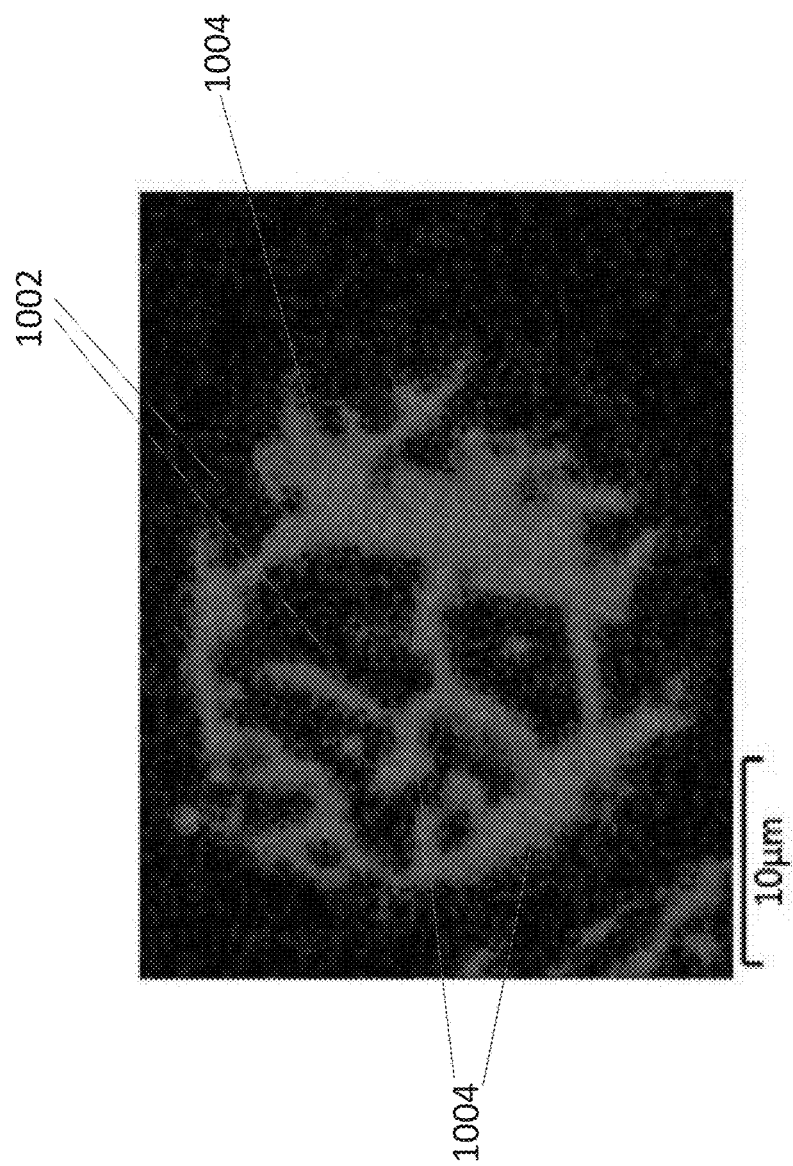
FIG. 1C is an EDS element composition map showing regions of high concentrations of nickel (Ni) of the particle of FIG. 1A.

An example of a particle of an exemplary powder is shown in FIGS. 1A-1C. FIG. 1A illustrates a scanning electron microscope (SEM) image of the particle. FIG. 1B illustrates an energy-dispersive X-ray Spectroscopy (EDS) element composition map using a specific imaging source to show regions of high concentrations of silicon (Si) of the particle of FIG. 1A. FIG. 1C illustrates an EDS element composition map using a specific imaging source to show regions of high concentrations of nickel (Ni). The particle contains in-situ formed composite alloy structures. When used in a battery, the high concentrations of Si regions make up an energy storage structure while the high concentration of Ni regions make up a reinforcing structure.

The energy storage structure stores charged ions while the reinforcing structure functions primarily as a high strength structural member to prevent particle breakup due to the large expansion of the energy storage structure when storing energy. The reinforcing structure 1004 also provides resistance to expansion by acting as a diluent phase, which reduces the overall expansion of the particle in a controlled way. The reinforcing structure 1004 further acts as an electronic conductor to provide a low resistance path for electrons to enter and leave the particle. As illustrated, there is alternating regions of energy storage structure 1002 and reinforcing structure 1004.

In some embodiments, the energy storage structure 1002 may include Si, Si alloys such as silicon oxide (SiO), tin (Sn), or Sn alloys such as tin oxide (SnO). In some embodiments, the energy storage structure may include any combination of aluminum (Al), magnesium (Mg), silver (Ag), zinc (Zn), antimony (Sb), bismuth (Bi), and/or lead (Pb).

In some embodiments, the reinforcing structure 1004 may include a combination of the element of the energy storage structure 1002 and nickel (Ni), copper (Cu), iron (Fe), aluminum (Al), magnesium (Mg), manganese (Mn), cobalt (Co), molybdenum (Mo), zirconium (Zr), vanadium (V), titanium (Ti), chromium (Cr), bismuth (Bi), antimony (Sb), germanium (Ge), boron (B), phosphorus (P), carbon (C), sulfur (S), nitrogen (N), and/or oxygen (O).

In some embodiments, the reinforcing structure may exhibit at least some level of energy storage capacity, such as between 0 and a value less than the energy storage phase. The energy storage capacity of the reinforcing structure 1004 may be less than the energy storage capacity of the energy storage structure 1002. The element(s) included in the energy storage structure 1002 and the reinforcing structure 1004 may be chosen to include two or more elements that phase separate into two or more phases via, e.g., eutectic or eutectoid reactions. The two or more phases may be stable phases and/or equilibrium metastable phases.

An example phase separating system includes the Ni—Si system which depending on the stoichiometry and cooling rates produces multiphase composite structures of compounds of Ni and Si such as NiSi, $NiSi_2$, $Ni_2Si$, and Si. Another example phase separating system is the Cu—Si system, which produces multiphase composite structures of compounds of Cu and Si such as $Cu_{19}Si_6$, $Cu_{15}Si_4$, $Cu_{33}Si_7$, $Cu_9Si_2$, and Si. Another example phase separating system includes the Fe—Si system, which produces multiphase composite structures of compounds of Fe and Si such as FeSi$_2$, FeSi, and Si. In some embodiments, the phase separating system may include a combination of Ni, Cu, and/or Fe and Si. At least one of the phases created through the phase separation is the energy storage structure 1002 and at least one of the phases is the reinforcing structure 1004.

In one example, the powder comprises X of a Ni and 1-X (or 100%-X) of a Si, where X is between 15% and 44% (or between about 15% and about 44%). In some implementations, X may also be between close to 0% and 40% (or about 0% and about 40%) or between 10% and 33% (or between about 10% and about 33%). In another example, the powder includes Y of Cu and 1-Y (or 100%-Y) of Si, where Y is between close to 0% and 76% (or about 0% and about 76%) or between 10% and 68% (or between about 10% and about 68%). In another example, the powder includes Z of Fe and 1-Z (or 100%-Z) of Si, where Z is between 0% and 44% (or between about 0% and about 44%) or between 10% and 30% (or between about 10% and about 30%). In some embodiments, the percentage of Si may be low (e.g. just above 25% or just above about 25%) while still maintaining an energy storage structure. In these embodiments, non-equilibrium structures or amorphous phases are produced which may be the energy storage structure. The non-equilibrium phases can be energy storage, reinforcing, or both.

When the powder is used in an anode of a lithium ion (Li-ion) battery, the energy storage structure 1002 provides the lithium (Li) storage within the anode of Li-ion battery. However, as described previously, volume cycling within the Li-ion battery causes strain upon the anode structure. In order to stabilize the lithium ion battery, including a composite structure, which comprises both the energy storage structure 1002 and the reinforcing structure 1004, provides strain tolerance because the reinforcing structure 1004 may effectively absorb strain and thus extend the cycle life of the powder. Without being limited by a particular theory, the reinforcing structure 1004 can be, though is not required to be, ductile and thus is mechanically stable as the energy storage structure 1002. The reinforcing structure 1004 and the energy storage structure 1002 are intimately mixed on a micron or submicron scale, and thus the energy storage structure 1002 is supported and strengthened by the reinforcing structure 1004. As illustrated, the energy storage structure 1002 and the reinforcing structure 1004 are bonded together. The bonding may be both chemical and/or physical bonding and may be primarily chemical bonding.

Both the strength and rigidity of the energy storage structure 1002 and the reinforcement phase 1004 may be increased based on the strength of the bond between the structures. The ability to effectively absorb strain and extend the cycle life of the powder material will be based on the size scale of both the energy storage structure 1002 and the reinforcing structure 1004. A finer microstructure can yield a higher ability to absorb strain and thus an extended cycle life. In some embodiments, the microstructure may be less than 1 μm (or less than about 1 μm) in size, less than 500 nm (or less than about 500 nm) in size, or less than 100 nm (or less than about 100 nm) in size.

A finer microstructure, especially in the energy storage structure 1002, can inhibit the formation of phases that generate mechanical stress due to volume expansion during operation of the device. For example, when used in a Li-ion battery and the energy storage structure 1002 includes Si, Li and Si may combine to create Li$_{15}$Si$_4$, which generates mechanical stress due to large volume expansion. A composite structure with a finer microstructure may inhibit the creation of Li$_{15}$Si$_4$ by resisting the volume expansion. The overall microstructure and the size scale of the energy storage structure 1002 and the reinforcing structure 1004 may be tailored based on the cooling rate of the particles after processing. In some embodiments, the cooling rate may be greater than 1000° C. per second (or greater than about 1000° C. per second), though the particular cooling rate is not limiting.

Further, a small particle size of the powder may provide improved strength which makes the powder more damage tolerant without losing structural integrity by halting crack propagation, and can, at least in part, reduce a three dimensional strain to effectively a two dimensional strain or a one dimensional strain. Reduction of the dimensions of strain, leads to increased damage tolerance. A small particle size of the powder also distributes the expansion and/or contraction stresses over the reinforcement structure 1004 at a finer scale (e.g. micron, nanometer scale) and thus better distributes the stresses over the entire reinforcement structure 1004.

In some embodiments, the reinforcing structure 1004 may be conductive or semi-conductive to provide low resistance path for electrons to enter and leave the structure which may lead to the use of less conductive additives within the battery structure. Further, when the reinforcing structure 1004 is conductive or semi-conductive, the voltage drop across the width of the particles of the powder decreases. When the powder is used in a battery, this creates lower impedance, improved rate capability, and lower variation in state of charge within the particles of the powder.

The conductivity of the reinforcing structure 1004 may mitigate a poorly conductive energy storage structure 1002. The reinforcing structure 1004 may be an ionic conductor. The reinforcing structure 1004 may be a high strength structural member to prevent particle breakup due to the large expansion of the energy storage structure 1002. The reinforcing structure 1004 may provide resistance to the expansion of the particles during energy storage. The reinforcing structure 1004 may be a diluent structure, which may reduce the overall expansion of the particle in a controlled way. In some embodiments, the amount of energy storage structure 1002 and the reinforcing structure 1004 may be tuned in order to tradeoff between battery capacity and extended cycle life. In some embodiments, a lower amount of energy storage structure 1002 lowers the amount of expansion and contraction due to the lower energy storage, which may aid in extending cycle life of the powder.

Figure 2A:
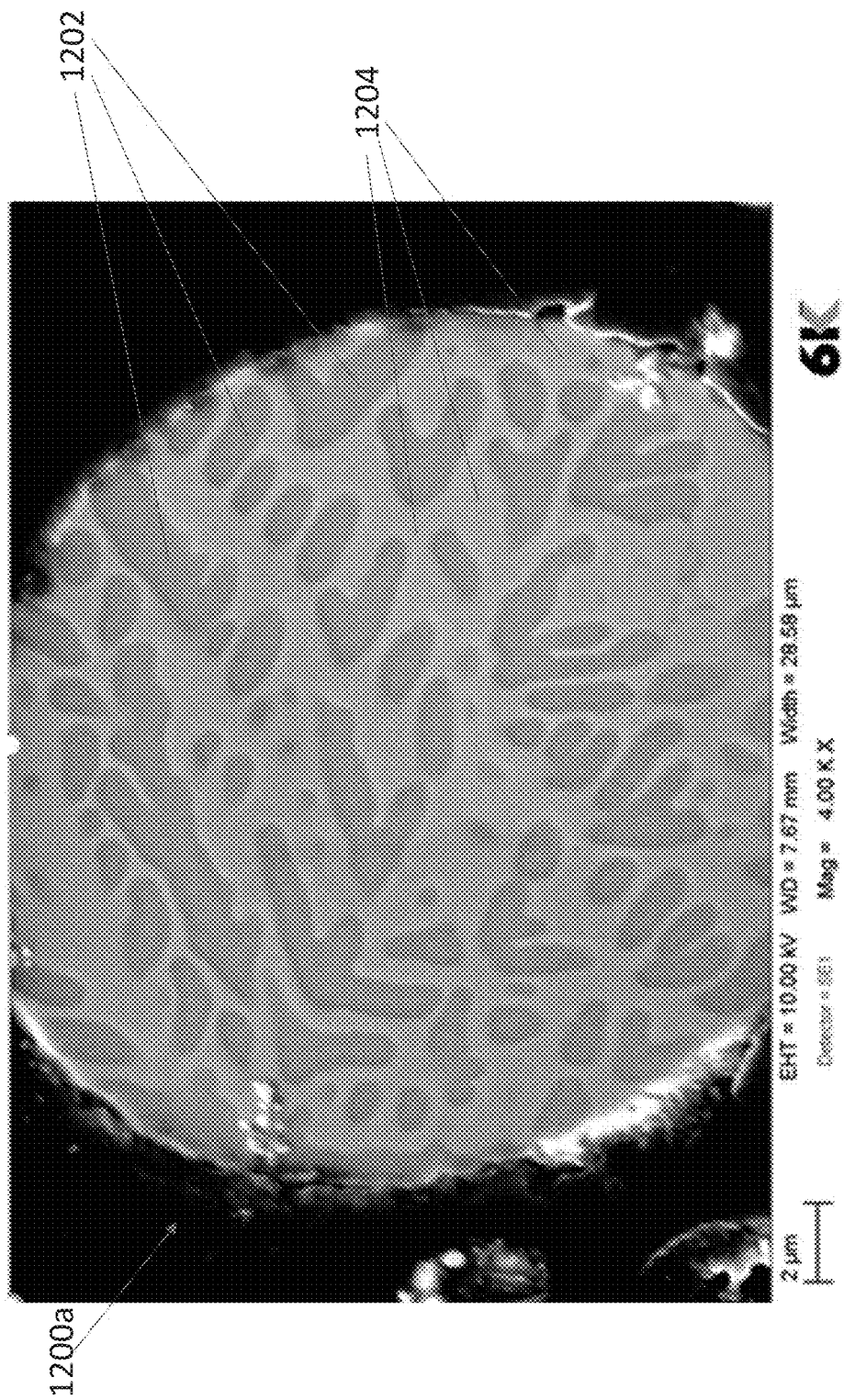
FIG. 2A is an image of an exemplary strain tolerant particle composed of a eutectic or eutectoid composition of silicon and nickel.

FIG. 2A is an SEM image of an exemplary strain tolerant particle 1200a composed of a eutectic or eutectoid composition of silicon and nickel. The particle 1200a includes a silicon mole fraction of 0.56 (or about 0.56) and a nickel mole fraction of 0.44 (or about 0.44). The particle 1200a includes a composite structure including a plurality of NiSi regions 1204 and a plurality of NiSi$_2$ regions 1202. The NiSi regions 1204 make up the energy storage structure and the NiSi$_2$ regions 1202 make up the reinforcing structure.

Figure 2B:
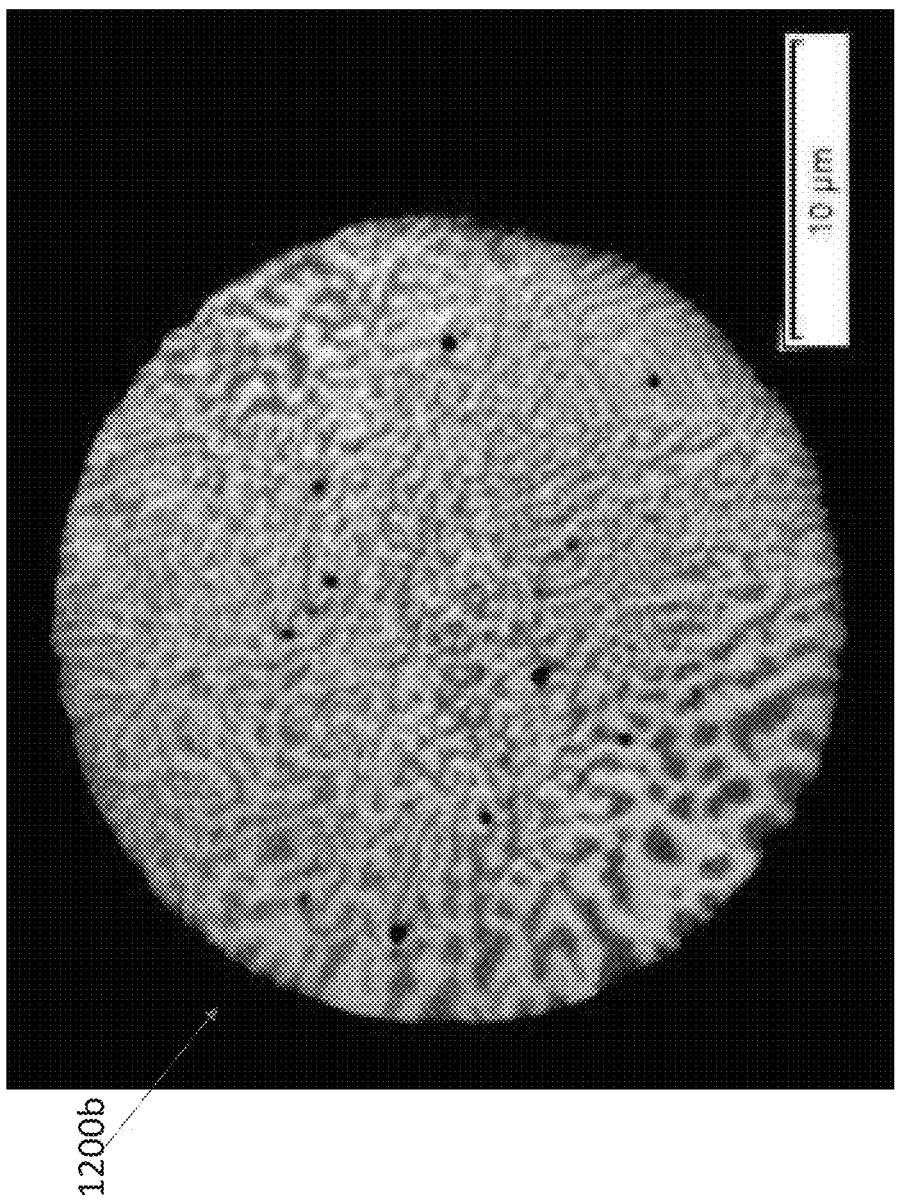
FIG. 2B is an image of an exemplary strain tolerant particle composed of a eutectic or eutectoid composition of silicon and nickel.

FIG. 2B is an SEM image of an exemplary strain tolerant particle 1200b composed of a eutectic or eutectoid composition of silicon and nickel. The particle 1200b includes a silicon mole fraction of 0.56 (or about 0.56) and a nickel mole fraction of 0.44 (or about 0.44). The particle 1200b includes a composite structure including a plurality of NiSi regions and a plurality of NiSi$_2$ regions. The darker regions are the NiSi$_2$ regions and the lighter regions are the NiSi regions. The NiSi regions may make up the energy storage structure and the NiSi$_2$ regions may make up the reinforcing structure.

Figure 3:
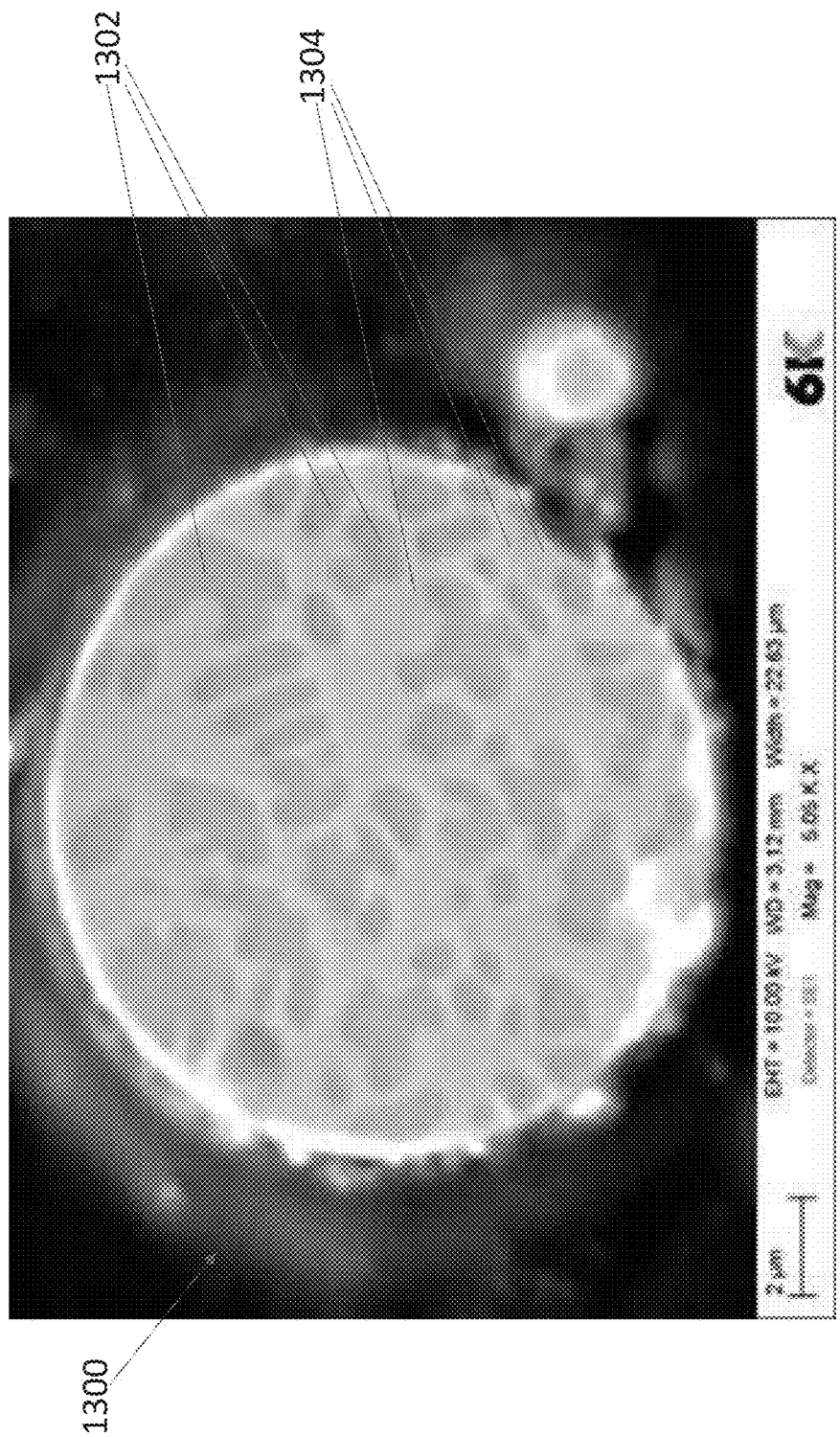
FIG. 3 is an image of an exemplary strain tolerant particle composed of hypereutectic composition of silicon and copper.

FIG. 3 is an SEM image of an exemplary strain tolerant particle 1300 composed of a hypereutectic composition of silicon and copper. The particle 1300 includes a silicon mole fraction of 0.68 (or about 0.68) and a copper mole fraction of 0.32 (or about 0.32). The particle 1300 includes a composite structure including a plurality of primary Si regions 1302 and a plurality of eutectic structured regions comprised of Si and a Cu—Si intermetallic compound 1304. The intermetallic compound may be comprised of $Cu_{19}Si_6$.

In some embodiments, there can be regions of "primary" Si that come out of the melt first, and then when the material cools below the bottom of the melt region, the remaining liquid will convert to a eutectic structure composed of regions of Si and of $Cu_{19}Si_6$.

The Si regions 1304 may make up the energy storage structure and the $Cu_{19}Si_6$ regions 1302 may make up the reinforcing structure.

Figure 4:
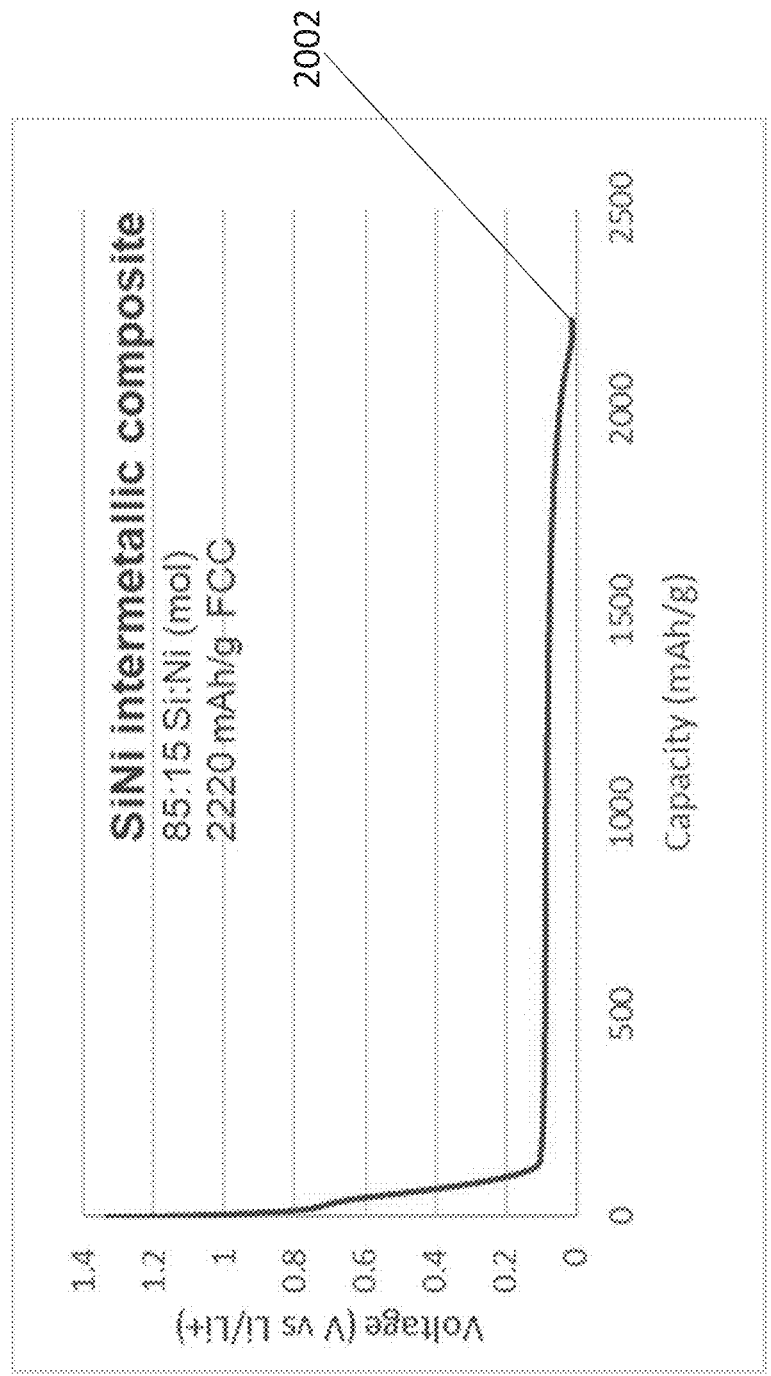
FIG. 4 is a chart of capacity vs voltage of an example anode of a lithium ion battery using strain tolerant particles according to the present disclosure.

FIG. 4 is a chart demonstrating capacity vs. voltage of an example battery using strain tolerant particles including Si and Ni. In this example, the particles contain 85 (or about 85) mole percentage Si and 15 (or about 15) mole percentage Ni. As illustrated, the vertical axis illustrates voltage (V vs Li/Li+, voltage vs. lithium) and the horizontal axis illustrates capacity. The chart illustrates a first charge capacity 2002 of over 2220 mAh/g (or over about 2220 mAh/g). As illustrated, the capacity decreases as the voltage increases with a shape decline at around 0.1 V. In some embodiments, a battery made using strain tolerant particles including Si and Ni may be 500 mAh/g to 3600 mAh/g (or about 500 mAh/g to about 3600 mAh/g) or 1000 mAh/g to 3000 mAh/g (or about 1000 mAh/g to about 3000 mAh/g).

Feedstocks

Disclosed herein are feedstock materials, or classes of feedstock materials, which can be used to manufacture particles containing in-situ formed composite alloy structures, which may be used as strain-tolerant high energy storage material structures. The structures can be in powder form, applicable in particular to anode chemistries that undergo large cyclic volume changes during charge and discharge, e.g. Si-based alloys, SiO, and Sn-based alloys. As mentioned, the strain tolerant powders can be composed of alternating energy storage structures and reinforcing structures. The energy storage structures may be used as the primary energy storage structure, which is capable of storing lithium ion particles when the particles are used in an anode of a lithium ion battery.

An example feedstock to produce the above mentioned particles is a finely divided feedstock with a predetermined ratio of constitute elements. In some embodiments, the feedstock may be produced through spray drying a mixture with the predetermined ratio of constitute elements. In this embodiment, a mixture of the predetermined ratio of constitute elements is produced. This mixture may or may not contain a binder. The binder may be polyacrylic acid, polyvinyl acetate, carboxymethylcellulose, styrene-butadiene rubber latex, polyvinyl alcohol, polyethylene glycol, starches, and/or other suitable binders. The mixture may be sprayed into a heated column of gas to remove a carrier solvent to produce a granular feedstock of the correct average composition. This process may be referred to as spray drying. The granular feedstock may be fine particulate material with a small particle size. In some embodiments, the spray dried feedstock may have particle sizes of less than 100 μm (or less than about 100 μm), less than 25 μm (or less than about 25 μm), or less than 10 μm (or less than about 10 μm), or less than 5 μm (or less than about 5 μm).

In some embodiments, the finely divided feedstock may be made by milling or grinding bulk material or coarse powder to produce a generally uniform powder. The generally uniform powder may be fine particulate material with a small particle size. The generally uniform powder may have a particle size of less than 100 μm (or less than about 100 μm), less than 25 μm (or less than about 25 μm), or less than 10 μm (or less than about 10 μm), or less than 5 μm (or less than about 5 μm). In this embodiment, the bulk material or coarse powders may contain the predetermined ratio of constituent elements. This bulk material or coarse powder is then milled to produce a finely divided feedstock. In some embodiments, separate bulk material or coarse powder composed of the target constituent elements may be milled or ground to produce fine powder of multiple components, and the resulting finely divided feedstocks may be combined in the appropriate ratios and spray dried, mechanically alloyed, or otherwise combined to create the uniform powder with the proper predetermined ratio of constituent elements. The mechanical alloying may be done by mechanically milling such as ball milling.

In some embodiments, the finely divided feedstock may be made by coating one or more constituent elements onto a core. The coating may be performed by electrodeposition, though the coating method is not limiting. In this embodiment, the core is provided which includes one of the predetermined elements. A coating process is performed on the core, which coats the core with one or more constituent elements such that the coated core includes the predetermined ratio of constitute elements. The coated core makes up the finely divided feedstock. Thus, the coating and core can melt and uniformly mix in some embodiments.

The predetermined ratio of constituent elements includes an energy storage material such as Si, Sn, Mg, Ag, Zn, Al, Pb, Sb, Bi, and their alloys and/or compounds and one or more additional alloying elements. The alloying elements may be chosen such that upon cooling from the melt, the energy storage material and the one or more alloying elements form a system capable of phase separating via a eutectic or eutectoid reaction into one or more energy storage phases and one or more reinforcing phases, which form a composite structure. The alloying elements to produce the advantageous composite structure include, but are not limited to, Ni, Cu, Fe, Al, Mg, Co, Mo, Zn, Zr, V, Ti, Cr, Bi, Sb, Ge, B, P, C, S, N, and O. The specific percentages of elements may be selected such as to provide a eutectic or eutectoid phase separation. An energy storage material and more than one alloying element may be used in order to produce more complex structures with additional phases and/or reinforcements.

A specific example includes a Si—Cu eutectic system, where Si is the energy storage material and Cu is the alloying element to create a two phase eutectic structure including Si as the energy storage structure and $Cu_{19}Si_6$ as the reinforcement structure. In a Si—Cu system, an equilibrium two-phase region including Si and $Cu_{19}Si_6$ exists when Si composes between 0.24 and 1.0 (or between about 0.24 and about 1.0) atomic fraction of the composition, with the eutectic composition when Si composes 0.32 (or about 0.32) atomic fraction of the composition. The only molecular structures that exist at equilibrium when Si composes between 0.32 and 1 (or between about 0.32 and about 1.0) atomic fraction of the composition is Si and $Cu_{19}Si_6$.

A hypoeutectic composition occurs when the Si composes between 0.24 and 0.32 (or between about 0.24 and about 0.32) atomic fraction of the composition. In a hypoeutectic composition, the molecular structures that exist are the eutectic $Si/Cu_{16}Si_6$ structure and excess $Cu_{19}Si_6$ structure. A eutectic composition occurs when the Si composes about 0.32 (or about 0.32) atomic fraction of the composition. In a eutectic composition, only the eutectic Si/$Cu_{19}Si_6$ structure will be present. A hypereutectic composition occurs at when Si composes between 0.32 and 1.0 (or between about 0.32 and about 1.0) atomic fraction of the composition which includes the eutectic Si/$Cu_{19}Si_6$ structure plus excess Si structure. The size of the excess Si structure is determined by the composition and the cooling rate. Thus, in a Si—Cu system, a mole fraction at 0.32 (or about 0.32) or higher of Si will create a eutectic phase separation when the feedstock is melted and then reformed that contains a eutectic structure of Si/$Cu_{19}Si_6$ and excess Si existing as primary grains distributed in the eutectic structure.

In some embodiments, the feedstock includes x mole fraction of Si and 1-x mole fraction of Cu, where x is above 0.24 (or above about 0.24) or above 0.32 (or above about 0.32). In some embodiments, x may be 0.4 to 0.95 (or about 0.4 to about 0.95) or 0.5 to 0.9 (or about 0.5 to about 0.9). The higher the mole fraction of Si the more energy storage capacity but the less reinforcing structure is present. The reinforcing structure prevents volume expansion and contraction during cycling and thus a greater amount of reinforcing phase leads to a higher cycle life.

In some embodiments, the weight percentage of Si may be greater than 12% (or greater than about 12%) which is equivalent to greater than 0.24 (or greater than about 0.24) atomic or mole fraction. In some embodiments, the weight percentage of Si may be greater than 17%, (or greater than about 17%) which is equivalent to greater than 0.32 (or greater than about 0.32) atomic or mole fraction. In some embodiments, the weight percentage of Si may be greater than 23% (or greater than about 23%) which is equivalent to greater than 0.4 (or greater than about 0.4) atomic or mole fraction. In some embodiments, the weight percentage of Si may be greater than 31% (or greater than about 31%) which is equivalent to greater than 0.5 (or greater than about 0.5) atomic or mole fraction. In some embodiments, the weight percentage of Si may be greater than 80% (or greater than about 80%) which is equivalent to greater than 0.9 (or greater than about 0.9) atomic or mole fraction. In some embodiments, the weight percentage of Si may be greater than 89% (or greater than about 89%) which is equivalent to greater than 0.95 (or greater than about 0.95) atomic or mole fraction.

Another specific example includes a Si—Ni system, with Si as the energy storage material and Ni as the alloying element to create a Si—Ni intermetallic reinforcement structure. In a Si—Ni system, a eutectic composition exists at 56 (or about 56) atomic or mole percent Si. At compositions where Si is between 50 and 67 (or between about 50 and about 67) atomic or mole percent, at equilibrium, a eutectic microstructure composed of NiSi and $NiSi_2$ occurs. At a higher cooling rate, non-equilibrium Si exists where Si is above 60 (or above about 60) atomic percent which may be due to kinetic limitations in the solid state.

When Si is above 67 (or above about 67) atomic percent, a composite structure occurs which at equilibrium is composed of a Si structure and $NiSi_2$ structure. The Si structure may be the energy storage structure while the $NiSi_2$ may be the reinforcement structure. At higher cooling rates, a NiSi structure may also be produced. In some embodiments, the feedstock includes 0.85 (or about 0.85) atomic fraction of Si and 0.15 (or about 0.15) atomic fraction of Ni.

In some embodiments, the feedstock includes y atomic fraction of Si and 1-y atomic fraction of Ni, where y is above 0.56 (or about 0.56). In some embodiments y may be 0.6 to 0.95 (or about 0.6 to about 0.95) or 0.7 to 0.9 (or about 0.7 to about 0.9). The higher the mole fraction of Si the more energy storage capacity but the less reinforcing structure is present. The reinforcing structure may limit volume expansion and contraction upon cycling. Thus, an increased amount of reinforcing structure may lead to an increased cycle life.

In some embodiments, the weight percentage of Si may be greater than 38% (or greater than about 38%) which is equivalent to greater than 0.56 (or greater than about 0.56) atomic or mole fraction. In some embodiments, the weight percentage of Si may be greater than 42% (or greater than about 42%) which is equivalent to greater than 0.6 (or greater than about 0.6) atomic or mole fraction. In some embodiments, the weight percentage of Si may be greater than 53% (or greater than about 53%) which is equivalent to greater than 0.7 (or greater than about 0.7) atomic or mole fraction. In some embodiments, the weight percentage of Si may be greater than 81% (or greater than about 81%) which is equivalent to greater than 0.9 (or greater than about 0.9) atomic or mole fraction. In some embodiments, the weight percentage of Si may be greater than 90% (or greater than about 90%) which is equivalent to greater than 0.95 (or greater than about 0.95) atomic or mole fraction.

Microwave plasma processing feedstock of the specific predetermined ratio of constituent elements may uniquely produce particles of alternating energy storage structures and reinforcing structures comprising a composite structure at the particle level. During cooling after microwave plasma processing, the specific predetermined ratio of constituent elements phase separate into a composite structure composed of energy storage structures and reinforcing structures. The characteristic size of the energy storage structures may be less than 5 μm (or less than about 5 μm), less than 1 μm (or less than about 1 μm), less than 500 nm (or less than about 500 nm), or less than 100 nm (or less than about 100 nm). It has been discovered that the unexpected result of the energy storage material and the alloying element(s) phase separating occurs via a eutectic or eutectoid reaction to form reinforced an in-situ grown composite structure.

Final Material

The final material includes a powder with an in-situ formed composite structure including alternating energy storage structures and reinforcing structures. In some embodiments, at least one of the energy storage structure or reinforcing structure may be rod or plate shaped. In some embodiments, at least one of the energy storage structure or the reinforcing structure may be interpenetrating crystalline or amorphous phases. In some embodiments, the energy storage structures and the reinforcing structures alternate amongst one another.

The reinforcing structure functions primarily as a high strength structural member to prevent particle breakup due to the large expansion of the storage structure when storing energy. As discussed previously, during full lithiation, the anode of a lithium ion battery may experience up to a 300% (or up to about a 300%) increase in volume which places large strain on the particle which can cause the particle to breakup. By preventing particle breakup, the reinforcing structure of the composite microstructure may extend cycle life of the lithium ion battery in order to satisfy the long felt, unsolved need of extended cycle life of the lithium ion battery using this class of high-energy anode materials. The reinforcing structure of the composite microstructures may further provide resistance to the expansion. The reinforcing structure may serve as a diluent structure, which may control the overall expansion of the particle, e.g. reduce the overall expansion of the particle. The reinforcing structure replaces energy storage structure that would otherwise be present and thus helps manage expansion.

Further, the reinforcing structure may limit the amount the energy storage structure can expand when the size scale of the energy storage structure and reinforcing structures are small. The reinforcing structure may also provide resistance to the strain of expansion by limiting the overall strain the particles experience. The reinforcing structure may further serve as an electronic conductor to provide a low resistance path for electrons to enter and leave the structure. The energy storage structure by itself may be a poor conductor and thus the reinforcing structure may provide a low resistance path for electrons into and out of the particle during charge and discharge. Without a low resistance path, voltage drops will be high and resistance will be large which may limit the ability of the particles to conduct. The reinforcing structure may be an ionic conductor. The reinforcing structure may also have energy storage properties.

The ability to effectively absorb strain and thus extend the cycle life of the particles with the energy storage structure and the reinforcing structure will be related to the size and scale of both the energy storage structure and the reinforcing structure, the strength and rigidity of the energy storage structure and the reinforcing structure, the morphology of the composite structure, the relative fractions of the energy storage structure and the reinforcing structure, and the strength of the bond between the energy storage structure and the reinforcing structure. In some embodiments, the morphology of the composite structure may be plates, rods, or spherical precipitates.

Further, using a high cooling rate after plasma processing produces fine size scales in the composite structure. A finer size scale of composite structures maximizes the resistance to mechanical damage. In some embodiments, the cooling rate may be greater than 1000° C. (or greater than about 1000° C.) per second, greater than 900° C. (or greater than about 900° C.) per second, greater than 800° C. (or greater than about 800° C.) per second, or greater than 700° C. (or greater than about 700° C.) per second. Further a high cooling rate may allow for the retention of non-equilibrium phases which can result in a greater fraction of energy storage structures than would be present with just equilibrium phases. In some embodiments, upon further cooling, the material may go through two or more phase separation regions (e.g. second or third phase separation regions) when single phase solid solutions drop below their solubility limit and further phase separate. In some embodiments, the material may be cooled to retain non-equilibrium structures. In some embodiments, additional heating may be performed to induce phase separations. The further phase separation may create desirable fine feature sizes.

In some embodiments, the particles can have size in a range of 0.5 µm to 100 µm (or about 0.5 µm to about 100 µm). In some embodiments, the particles can have a size of 20 µm (or about 20 µm) or less. Further, the particles can have a size of 10 µm to 40 µm (or about 10 µm to about 40 µm), 15 µm to 30 µm (or about 15 µm to about 30 µm), or 17 µm to 25 µm (or about 17 µm to about 25 µm). In some embodiments, the particles may have a size of 1 µm to 5 µm (or about 1 µm to about 5 µm) or 0.5 µm to 10 µm (or about 0.5 µm to about 10 µm). The size of the particles may be determined by the size of the feedstock which is plasma processed. Further, the ratios of elements within the starting feedstock may determine the ratios of elements within the particles. Thus, by using a feedstock with 0.85 (or about 0.85) mole fraction of silicon and 0.15 (or about 0.15) mole fraction of nickel, the mole fraction of the resulting particle may be substantially 0.85 (or about 0.85) mole fraction of silicon and 0.15 (or about 0.15) mole fraction of nickel.

In some embodiments, the energy storage structure may comprise 80% (or about 80%) of the particle while the reinforcing structure may comprise 20% (or about 20%) of the particle. In some embodiments, the energy storage structure has a weight percentage of greater than 5% (or greater than about 5%) or greater than 10% (or greater than about 10%) of the particle. In some embodiments, the energy storage structure has a weight percentage of 20% to 80% (or about 20% to about 80%) or 30% to 60% (or about 30% to about 60%) or 20% to 95% (or about 20% to about 95%) of the particle.

Sphericity

In some embodiments, the final particles achieved by processing can be spherical or spheroidal, terms which can be used interchangeably.

Embodiments of the present disclosure are directed to producing particles that are substantially spherical or spheroidal or have undergone significant spheroidization. In some embodiments, spherical, spheroidal or spheroidized particles refer to particles having a sphericity greater than a certain threshold. Particle sphericity can be calculated by calculating the surface area of a sphere $A_{s,\ ideal}$ with a volume matching that of the particle, V using the following equation:

$$r_{ideal} = \sqrt[*]{\frac{3V}{4\pi}}$$

$$A_{s,ideal} = A_{s,actual}$$

and then comparing that idealized surface area with the measured surface area of the particle, $A_{s,\ actual}$:

$$\text{Sphericity} = \frac{A_{s,ideal}}{A_{s,actual}}.$$

In some embodiments, particles can have a sphericity of greater than 0.5, 0.6, 0.7, 0.75, 0.8, 0.9, 0.91, 0.95, or 0.99 (or greater than about 0.5, about 0.6, about 0.7, about 0.75, about 0.8, about 0.8, about 0.91, about 0.95, or about 0.99). In some embodiments, particles can have a sphericity of 0.75 or greater or 0.91 or greater (or about 0.75 or greater or about 0.91 or greater). In some embodiments, particles can have a sphericity of less than 0.5, 0.6, 0.7, 0.75, 0.8, 0.9, 0.91, 0.95, or 0.99 (or less than about 0.5, about 0.6, about 0.7, about 0.75, about 0.8, about 0.8, about 0.91, about 0.95, or about 0.99). In some embodiments, a particle is considered to be spherical, spheroidal or spheroidized if it has a sphericity at or above any of the aforementioned sphericity values, and in some preferred embodiments, a particle is considered to be spherical if its sphericity is at or about 0.75 or greater or at or about 0.91 or greater.

In some embodiments, a median sphericity of all particles within a given powder can be greater than 0.5, 0.6, 0.7, 0.75, 0.8, 0.9, 0.91, 0.95, or 0.99 (or greater than about 0.5, about 0.6, about 0.7, about 0.75, about 0.8, about 0.8, about 0.91, about 0.95, or about 0.99). In some embodiments, a median sphericity of all particles within a given powder can be less than 0.5, 0.6, 0.7, 0.75, 0.8, 0.9, 0.91, 0.95, or 0.99 (or less than about 0.5, about 0.6, about 0.7, about 0.75, about 0.8, about 0.8, about 0.91, about 0.95, or about 0.99). In some embodiments, a powder is considered to be spheroidized if all or a threshold percentage (as described by any of the fractions below) of the particles measured for the given powder have a median sphericity greater than or equal to any of the aforementioned sphericity values, and in some preferred embodiments, a powder is considered to be spheroidized if all or a threshold percentage of the particles have a median sphericity at or about 0.75 or greater or at or about 0.91 or greater.

In some embodiments, the fraction of particles within a powder that can be above a given sphericity threshold, such as described above, can be greater than 50%, 60%, 70%, 80%, 90%, 95%, or 99% (or greater than about 50%, about 60%, about 70%, about 80%, about 90%, about 95%, or about 99%). In some embodiments, the fraction of particles within a powder that can be above a given sphericity threshold, such as described above, can be less than 50%, 60%, 70%, 80%, 90%, 95%, or 99% (or less than about 50%, about 60%, about 70%, about 80%, about 90%, about 95%, or about 99%).

Particle size distribution and sphericity may be determined by any suitable known technique such as by SEM, optical microscopy, dynamic light scattering, laser diffraction, manual measurement of dimensions using an image analysis software, for example from about 15-30 μmeasures per image over at least three images of the same material section or sample, and any other techniques.

Embodiments of the disclosed process can include feeding the powders using a powder feeder into a microwave generated plasma where the power density, gas flows and residence time are controlled. The process parameters such as power density, flow rates and residence time of the powder in the plasma can depend on the powder material's physical characteristics, such as the melting point and thermal conductivity. The power density can range from 20 W/cm$^3$ to 500 W/cm$^3$ (or about 20 W/cm$^3$ to about 500 W/cm$^3$). The total gas flows can range from 0.1 cfm to 50 cfm (or about 0.1 cfm to about 50 cfm), and the residence time can be tuned from 1 ms to 10 sec (or about 1 ms to about 10 sec). This range of process parameters will cover the required processing parameters for materials with a wide range of melting point and thermal conductivity.

Different environmental gasses can be used for different applications.

Plasma Processing

The above disclosed particles/structures/powders/precursors can be used in a number of different processing procedures. For example, spray/flame pyrolysis, radiofrequency plasma processing, and high temperature spray driers can all be used. The following disclosure is with respect to microwave plasma processing, but the disclosure is not so limiting.

In some cases, the feedstock may include a well-mixed slurry containing the constituent solid materials suspended in a liquid carrier medium which can be fed through a droplet making device. Some embodiments of the droplet making device include a nebulizer and atomizer. The droplet maker can produce solution precursor droplets with diameters ranging approximately 1 um-200 um. The droplets can be fed into the microwave plasma torch, a plasma plume of the microwave plasma torch, and/or an exhaust of the microwave plasma torch. As each droplet is heated within a plasma hot zone created by the microwave plasma torch, the carrier liquid is driven off and the remaining dry components melt to form a molten droplet containing the constituent elements. The plasma gas can be argon, nitrogen, helium hydrogen or a mixture thereof.

In some embodiments, the droplet making device can sit to the side of the microwave plasma torch. The feedstock material can be fed by the droplet making device from the side of the microwave plasma torch. The droplets can be fed from any direction into the microwave generated plasma.

Amorphous material can be produced after the precursor is processed into the desired material and is then cooled at a rate sufficient to prevent atoms to reach a crystalline state. The cooling rate can be achieved by quenching the material within 0.05-2 seconds of processing in a high velocity gas stream. The high velocity gas stream temperature can be in the range of −200° C.-40° C.

Alternatively, crystalline material can be produced when the plasma length and reactor temperature are sufficient to provide particles with the time and temperature necessary for atoms to diffuse to their thermodynamically favored crystallographic positions. The length of the plasma and reactor temperature can be tuned with parameters such as power (2-120 kW), torch diameter (0.5-4"), reactor length (0.5-30'), gas flow rates (1-20 CFM), gas flow characteristics (laminar or turbulent), and torch type (laminar or turbulent). Longer time at the right temperature results in more crystallinity.

The process parameters can be optimized to obtain maximum spheroidization depending on the feedstock initial condition. For each feedstock characteristic, process parameters can be optimized for a particular outcome. U.S. Pat. Pub. No. 2018/0297122, U.S. Pat. Nos. 8,748,785 B2, and 9,932,673 B2 disclose certain processing techniques that can be used in the disclosed process, specifically for microwave plasma processing. Accordingly, U.S. Pat. Pub. No. 2018/0297122, U.S. Pat. Nos. 8,748,785 B2, and 9,932,673 B2 are incorporated by reference in its entirety and the techniques describes should be considered to be applicable to the feedstock described herein.

One aspect of the present disclosure involves a process of spheroidization using a microwave generated plasma. The powder feedstock is entrained in a gas environment and injected into the microwave plasma environment. Upon injection into a hot plasma (or plasma plume or exhaust), the feedstock is spheroidized and released into a chamber filled with a gas and directed into drums where is it stored. This process can be carried out at atmospheric pressure, in a partial vacuum, or at a higher pressure than atmospheric pressure. In alternative embodiments, the process can be carried out in a low, medium, or high vacuum environment. The process can run continuously and the drums are replaced as they fill up with spheroidized particles.

Advantageously, varying cooling processing parameters has been found to alter the characteristic microstructure of the end particles. A higher cooling rate results in a finer structure. Non-equilibrium structure may be achieved via high cooling rates.

Cooling processing parameters include, but are not limited to, cooling gas flow rate, residence time of the spheroidized particles in the hot zone, and the composition or make of the cooling gas. For example, the cooling rate or quenching rate of the particles can be increased by increasing the rate of flow of the cooling gas. The faster the cooling gas is flowed past the spheroidized particles exiting the plasma, the higher the quenching rate-thereby allowing certain desired microstructures to be locked-in. Residence time of the particles within the hot zone of the plasma can also be adjusted to provide control over the resulting microstructure. Residence time can be adjusted by adjusting such operating variables as particle injection rate and flow rate (and conditions, such as laminar flow or turbulent flow)

within the hot zone. Equipment changes can also be used to adjust residence time. For example, residence time can be adjusted by changing the cross-sectional area of the hot zone.

Another cooling processing parameter that can be varied or controlled is the composition of the cooling gas. Certain cooling gases are more thermally conductive than others. For example helium is considered to be a highly thermally conductive gas. The higher the thermal conductivity of the cooling gas, the faster the spheroidized particles can be cooled/quenched. By controlling the composition of the cooling gas (e.g., controlling the quantity or ratio of high thermally conductive gasses to lesser thermally conductive gases) the cooling rate can be controlled.

In one exemplary embodiment, inert gas is continually purged to remove oxygen within a powder-feed hopper. A continuous volume of powder feed is then entrained within an inert gas and fed into the microwave generated plasma to prevent excessive oxidation of the material. In one example, the microwave generated plasma may be generated using a microwave plasma torch, as described in U.S. Pat. Nos. 8,748,785, 9,023,259, 9,206,085, 9,242,224, and 10,477,665 each of which is hereby incorporated by reference in its entirety.

In some embodiments, the particles are exposed to a uniform (or non-uniform) temperature profile at between 4,000 and 8,000 K within the microwave generated plasma. In some embodiments, the particles are exposed to a uniform temperature profile at between 3,000 and 8,000 K within the microwave generated plasma. Within the plasma torch, the powder particles are rapidly heated and melted. As the particles within the process are entrained within a gas, such as argon, generally contact between particles is minimal, greatly reducing the occurrence of particle agglomeration. The need for post-process sifting is thus greatly reduced or eliminated, and the resulting particle size distribution could be practically the same as the particle size distribution of the input feed materials. In exemplary embodiments, the particle size distribution of the feed materials is maintained in the end products.

Within the plasma, plasma plume, or exhaust, the melted materials are inherently spheroidized due to liquid surface tension. As the microwave generated plasma exhibits a substantially uniform temperature profile, more than 90% spheroidization of particles could be achieved (e.g., 91%, 93%, 95%, 97%, 99%, 100%). After exiting the plasma, the particles are cooled before entering collection bins. When the collection bins fill, they can be removed and replaced with an empty bin as needed without stopping the process.

Figure 5:
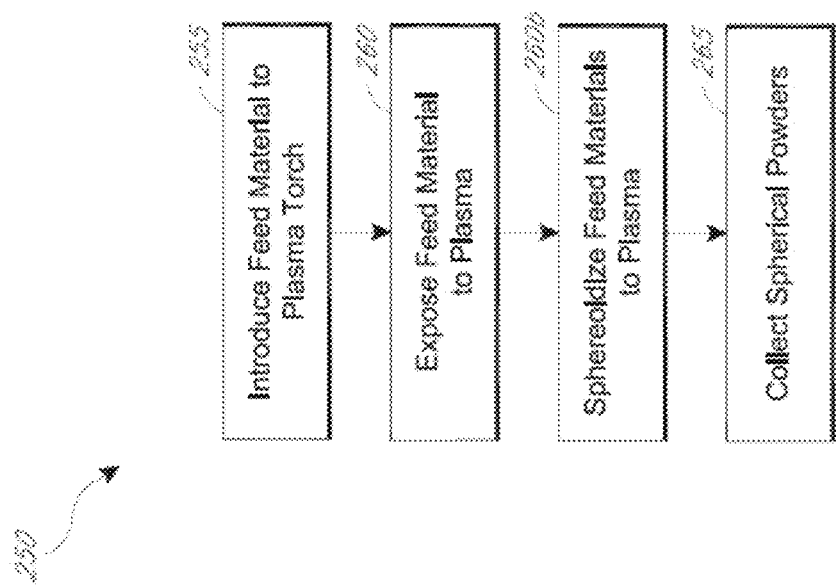
FIG. 5 illustrates an example embodiment of a method of producing powders according to the present disclosure.

FIG. 5 is a flow chart illustrating an exemplary method (250) for producing spherical powders, according to an embodiment of the present disclosure. In this embodiment, the process (250) begins by introducing a feed material into a plasma torch (255). In some embodiments, the plasma torch is a microwave generated plasma torch or an RF plasma torch. Within the plasma torch, the feed materials are exposed to a plasma causing the materials to melt, as described above (260). The melted materials are spheroidized by surface tension, as discussed above (260b). After exiting the plasma, the products cool and solidify, locking in the spherical shape and are then collected (265).

In some embodiments, the environment and/or sealing requirements of the bins are carefully controlled. That is, to prevent contamination or potential oxidation of the powders, the environment and or seals of the bins are tailored to the application. In one embodiment, the bins are under a vacuum. In one embodiment, the bins are hermetically sealed after being filled with powder generated in accordance with the present technology. In one embodiment, the bins are back filled with an inert gas, such as, for example argon. Because of the continuous nature of the process, once a bin is filled, it can be removed and replaced with an empty bin as needed without stopping the plasma process.

The methods and processes in accordance with the disclosure can be used to make powders, such as spherical powders.

In some embodiments, the processing discussed herein, such as the microwave plasma processing, can be controlled to prevent and/or minimize certain elements from escaping the feedstock during the melt, which can maintain the desired composition/microstructure.

Figure 6:
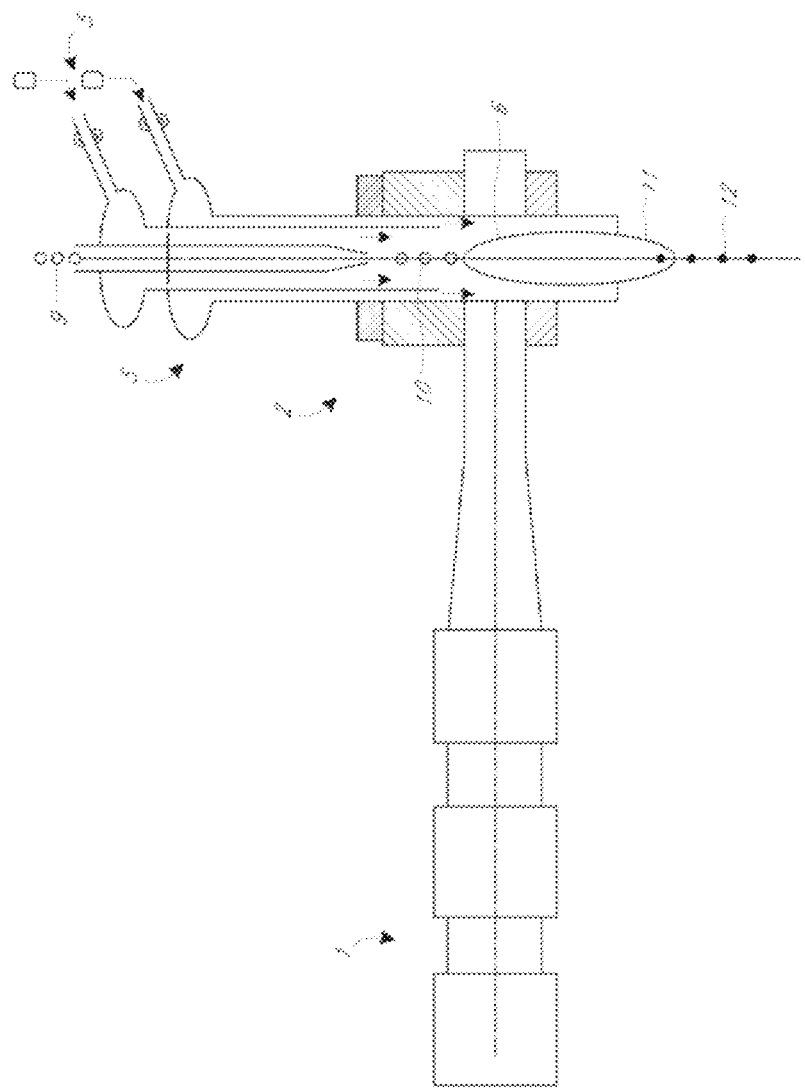
FIG. 6 illustrates an embodiment of a microwave plasma torch that can be used in the production of powders, according to embodiments of the present disclosure.

FIG. 6 illustrates an exemplary microwave plasma torch that can be used in the production of powders, according to embodiments of the present disclosure. As discussed above, feed materials 9, 10 can be introduced into a microwave plasma torch 3, which sustains a microwave generated plasma 11. In one example embodiment, an entrainment gas flow and a sheath flow (downward arrows) may be injected through inlets 5 to create flow conditions within the plasma torch prior to ignition of the plasma 11 via microwave radiation source 1.

In some embodiments, the entrainment flow and sheath flow are both axis-symmetric and laminar, while in other embodiments the gas flows are swirling. The feed materials 9 are introduced axially into the microwave plasma torch, where they are entrained by a gas flow that directs the materials toward the plasma. Within the microwave generated plasma, the feed materials are melted in order to spheroidize the materials. Inlets 5 can be used to introduce process gases to entrain and accelerate particles 9, 10 along axis 12 towards plasma 11. First, particles 9 are accelerated by entrainment using a core laminar gas flow (upper set of arrows) created through an annular gap within the plasma torch. A second laminar flow (lower set of arrows) can be created through a second annular gap to provide laminar sheathing for the inside wall of dielectric torch 3 to protect it from melting due to heat radiation from plasma 11. In exemplary embodiments, the laminar flows direct particles 9, 10 toward the plasma 11 along a path as close as possible to axis 12, exposing them to a substantially uniform temperature within the plasma.

In some embodiments, suitable flow conditions are present to keep particles 10 from reaching the inner wall of the plasma torch 3 where plasma attachment could take place. Particles 9, 10 are guided by the gas flows towards microwave plasma 11 where each undergoes homogeneous thermal treatment. Various parameters of the microwave generated plasma, as well as particle parameters, may be adjusted in order to achieve desired results. These parameters may include microwave power, feed material size, feed material insertion rate, gas flow rates, plasma temperature, residence time and cooling rates. In some embodiments, the cooling or quenching rate is not less than $10^{+3}$ degrees C./sec upon exiting plasma 11. As discussed above, in this particular embodiment, the gas flows are laminar; however, in alternative embodiments, swirl flows or turbulent flows may be used to direct the feed materials toward the plasma.

Figure 7A:
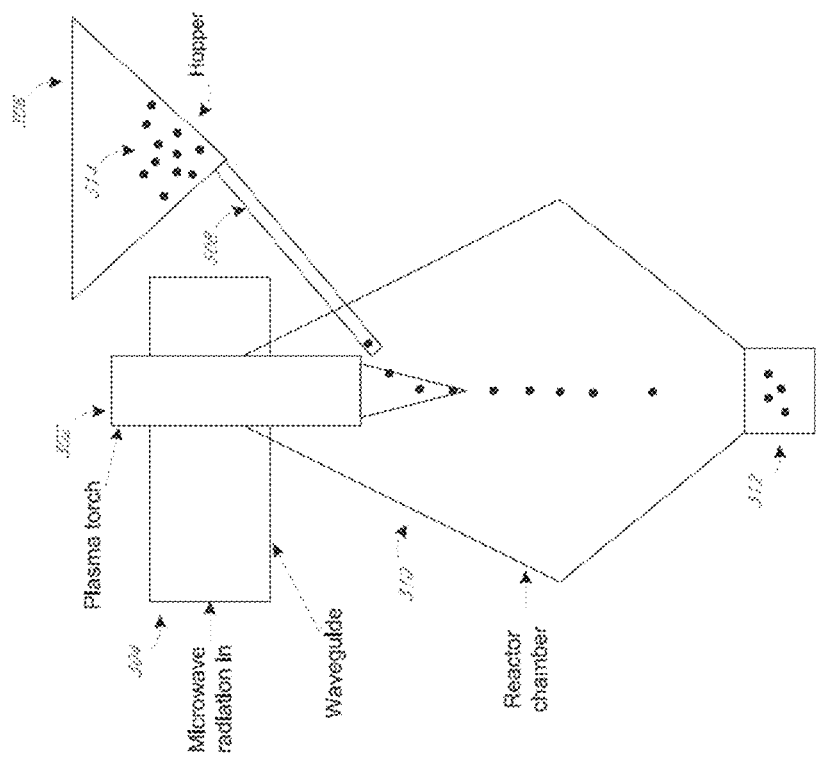
FIGS. 7A-7B illustrate embodiments of a microwave plasma torch that can be used in the production of powders, according to a side feeding hopper embodiment of the present disclosure.
Figure 7B:
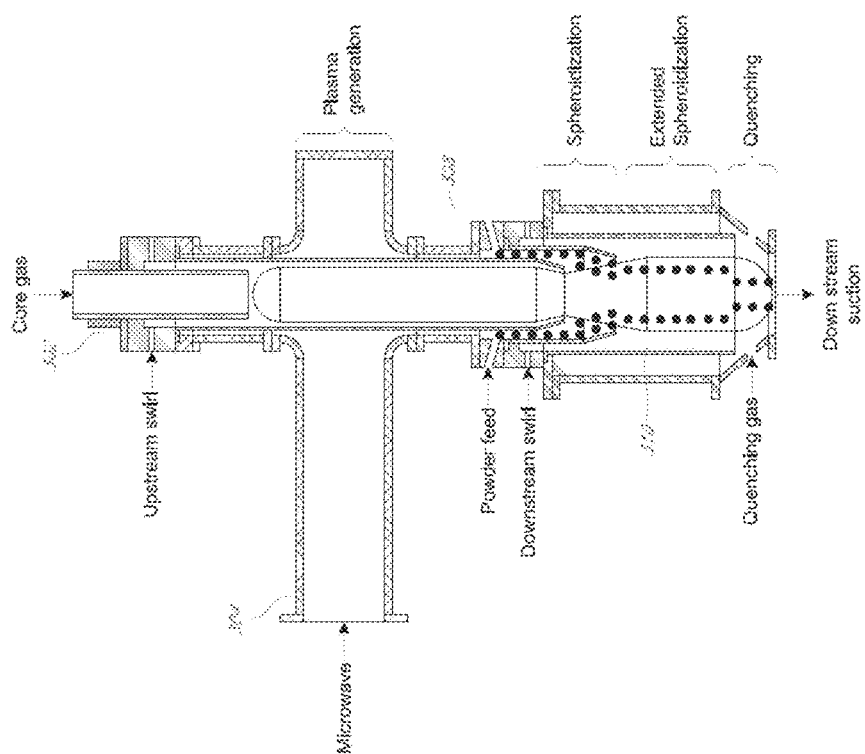

FIGS. 7A-B illustrate an exemplary microwave plasma torch that includes a side feeding hopper rather than the top feeding hopper shown in the embodiment of FIG. 6, thus allowing for downstream feeding. Thus, in this implementation the feedstock is injected after the microwave plasma torch applicator for processing in the "plume" or "exhaust" of the microwave plasma torch. Thus, the plasma of the microwave plasma torch is engaged at the exit end of the plasma torch to allow downstream feeding of the feedstock, as opposed to the top-feeding (or upstream feeding) discussed with respect to FIG. 6. This downstream feeding can advantageously extend the lifetime of the torch as the hot zone is preserved indefinitely from any material deposits on the walls of the hot zone liner. Furthermore, it allows engaging the plasma plume downstream at temperature suitable for optimal melting of powders through precise targeting of temperature level and residence time. For example, there is the ability to dial the length of the plume using microwave powder, gas flows, and pressure in the quenching vessel that contains the plasma plume.

Generally, the downstream spheroidization method can utilize two main hardware configurations to establish a stable plasma plume which are: annular torch, such as described in U.S. Pat. Pub. No. 2018/0297122, or swirl torches described in U.S. Pat. Nos. 8,748,785 B2 and 9,932,673 B2. Both FIG. 7A and FIG. 7B show embodiments of a method that can be implemented with either an annular torch or a swirl torch. A feed system close-coupled with the plasma plume at the exit of the plasma torch is used to feed powder axisymmetrically to preserve process homogeneity.

Other feeding configurations may include one or several individual feeding nozzles surrounding the plasma plume. The feedstock powder can enter the plasma at a point from any direction and can be fed in from any direction, 360° around the plasma, into the point within the plasma. The feedstock powder can enter the plasma at a specific position along the length of the plasma plume where a specific temperature has been measured and a residence time estimated for sufficient melting of the particles. The melted particles exit the plasma into a sealed chamber where they are quenched then collected.

The feed materials 314 can be introduced into a microwave plasma torch 302. A hopper 306 can be used to store the feed material 314 before feeding the feed material 314 into the microwave plasma torch 302, plume, or exhaust. The feed material 314 can be injected at any angle to the longitudinal direction of the plasma torch 302. 5, 10, 15, 20, 25, 30, 35, 40, 45, 50, or 55 degrees. In some embodiments, the feedstock can be injected an angle of greater than 5, 10, 15, 20, 25, 30, 35, 40, 45, 50, or 55 degrees. In some embodiments, the feedstock can be injected an angle of less than 5, 10, 15, 20, 25, 30, 35, 40, 45, 50, or 55 degrees. In alternative embodiments, the feedstock can be injected along the longitudinal axis of the plasma torch.

The microwave radiation can be brought into the plasma torch through a waveguide 304. The feed material 314 is fed into a plasma chamber 310 and is placed into contact with the plasma generated by the plasma torch 302. When in contact with the plasma, plasma plume, or plasma exhaust, the feed material melts. While still in the plasma chamber 310, the feed material 314 cools and solidifies before being collected into a container 312. Alternatively, the feed material 314 can exit the plasma chamber 310 while still in a melted phase and cool and solidify outside the plasma chamber. In some embodiments, a quenching chamber may be used, which may or may not use positive pressure. While described separately from FIG. 6, the embodiments of FIGS. 7A-7B are understood to use similar features and conditions to the embodiment of FIG. 6.

In some embodiments, implementation of the downstream injection method may use a downstream swirl, extended spheroidization, or quenching. A downstream swirl refers to an additional swirl component that can be introduced downstream from the plasma torch to keep the powder from the walls of the tube. An extended spheroidization refers to an extended plasma chamber to give the powder longer residence time. In some implementations, it may not use a downstream swirl, extended spheroidization, or quenching. In some embodiments, it may use one of a downstream swirl, extended spheroidization, or quenching. In some embodiments, it may use two of a downstream swirl, extended spheroidization, or quenching.

Injection of powder from below may result in the reduction or elimination of plasma-tube coating in the microwave region. When the coating becomes too substantial, the microwave energy is shielded from entering the plasma hot zone and the plasma coupling is reduced. At times, the plasma may even extinguish and become unstable. Decrease of plasma intensity means decreases in spheroidization level of the powder. Thus, by feeding feedstock below the microwave region and engaging the plasma plume at the exit of the plasma torch, coating in this region is eliminated and the microwave powder to plasma coupling remains constant through the process allowing adequate spheroidization.

Thus, advantageously the downstream approach may allow for the method to run for long durations as the coating issue is reduced. Further, the downstream approach allows for the ability to inject more powder as there is no need to minimize coating.

From the foregoing description, it will be appreciated that inventive processing methods, precursors, anodes, and powders are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

The disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A particle comprising:
a composite structure including:
a eutectic, eutectoid, or hypereutectic structure comprising alternating regions of an energy storage structure and a reinforcing structure;
the energy storage structure comprising at least one element, wherein the energy storage structure is configured to store ions; and
the reinforcing structure comprising one or more elements that phase separate from the energy storage structure via a eutectic or eutectoid reaction, wherein the reinforcing structure provides mechanical support to the energy storage structure,
wherein at least one of the energy storage structure or the reinforcing structure comprises interpenetrating crystalline or amorphous phases.

2. The particle of claim 1, wherein the energy storage structure comprises silicon and/or tin.

3. The particle of claim 1, wherein the reinforcing structure comprises nickel, copper, iron, aluminum, magnesium, manganese, cobalt, molybdenum, zirconium, vanadium, titanium, chromium, bismuth, antimony, germanium, boron, phosphorus, carbon, sulfur, nitrogen, and/or oxygen.

4. The particle of claim 1, wherein the energy storage structure comprises silicon and the reinforcing structure comprises nickel and silicon.

5. The particle of claim 4, wherein the reinforcing structure comprises $NiSi_2$ and $NiSi$.

6. The particle of claim 4, wherein the reinforcing structure comprises a higher nickel content than the nickel content of the energy storage structure.

7. The particle of claim 4, wherein the composite structure comprises a silicon mole fraction greater than or equal to about 0.56.

8. The particle of claim 4, wherein the composite structure comprises a silicon mole fraction greater than or equal to about 0.7.

9. The particle of claim 1, wherein the energy storage structure comprises silicon and the reinforcing structure comprises copper and silicon.

10. The particle of claim 9, wherein the reinforcing structure comprises $Cu_{19}Si_6$.

11. The particle of claim 9, wherein the reinforcing structure comprises a higher copper content than the copper content of the energy storage structure.

12. The particle of claim 9, wherein the composite structure comprises a silicon mole fraction greater than or equal to about 0.24.

13. The particle of claim 9, wherein the composite structure comprises a silicon mole fraction greater than or equal to about 0.32.

14. The particle of claim 1, wherein the composite structure comprises a plurality of energy storage structures and a plurality of reinforcing structures that bind the plurality of energy storage structures.

15. The particle of claim 1, wherein the alternating regions comprise stable phases.

16. The particle of claim 1, wherein the alternating regions comprise equilibrium metastable phases.

17. A method of manufacturing a particle comprising:
preparing a feedstock comprising divided droplets or particles with a certain ratio of constituent elements that phase separate into two or more phases by eutectic or eutectoid reaction;
introducing the feedstock into a plasma or plasma exhaust of a microwave plasma torch to melt the feedstock; and
cooling the feedstock so as to trigger a eutectic or eutectoid transition resulting in one or more phase separations which create a eutectic, eutectoid, or hypereutectic structure comprising alternating regions of an energy storage structure and a reinforcing structure that provides mechanical support to the energy storage structure,
the energy storage structure comprising at least one element, wherein the energy storage structure is configured to store ions,
the reinforcing structure comprising one or more elements that phase separate from the energy storage structure, wherein the reinforcing structure provides mechanical support to the energy storage structure,
wherein at least one of the energy storage structure or the reinforcing structure comprises interpenetrating crystalline or amorphous phases.

18. The method of manufacturing of claim 17, wherein the feedstock comprises silicon and at least one of copper, nickel, or iron.

19. The method of manufacturing of claim 18, wherein the feedstock comprises nickel and comprises a silicon mole fraction greater than or equal to about 0.7.

20. A particle comprising:
a composite structure including:
- a eutectic, eutectoid, or hypereutectic structure comprising alternating regions of an energy storage phase and a reinforcing phase,
- the energy storage phase comprising at least one element, wherein the energy storage phase is configured to store ions; and
- the reinforcing phase comprising one or more elements, and
- wherein at least one of the energy storage phase or the reinforcing phase comprises interpenetrating crystalline or amorphous phases;
- wherein upon cooling the composite structure from a melt, a eutectic or eutectoid transition occurs resulting in phase separation of the composite structure into two or more distinct phases, at least one phase of which is the energy storage phase, and at least one phase of which is the reinforcing phase, resulting in an in-situ grown composite microstructure at a particle level, wherein the reinforcing phase provides mechanical support to the energy storage phase.

* * * * *